(12) United States Patent
Kajiyama et al.

(10) Patent No.: US 11,532,990 B2
(45) Date of Patent: Dec. 20, 2022

(54) POWER CONVERSION DEVICE THAT PERFORMS DC-TO-DC CONVERSION

(71) Applicant: Mitsubishi Electric Corporation, Tokyo (JP)

(72) Inventors: Takuya Kajiyama, Tokyo (JP); Takaharu Ishibashi, Tokyo (JP); Takushi Jimichi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/973,778

(22) PCT Filed: Jul. 31, 2019

(86) PCT No.: PCT/JP2019/030019
§ 371 (c)(1),
(2) Date: Dec. 10, 2020

(87) PCT Pub. No.: WO2020/031807
PCT Pub. Date: Feb. 13, 2020

(65) Prior Publication Data
US 2021/0249963 A1   Aug. 12, 2021

(30) Foreign Application Priority Data

Aug. 6, 2018  (JP) .............................. JP2018-147497

(51) Int. Cl.
*H02M 3/335* (2006.01)
*H02M 1/08* (2006.01)
*H02M 1/36* (2007.01)

(52) U.S. Cl.
CPC ......... *H02M 3/33584* (2013.01); *H02M 1/08* (2013.01); *H02M 1/36* (2013.01); *H02M 3/33573* (2021.05)

(58) Field of Classification Search
CPC ............ H02M 3/00; H02M 3/01; H02M 3/22; H02M 3/24; H02M 3/315; H02M 3/3155;
(Continued)

(56) References Cited

U.S. PATENT DOCUMENTS

| 5,594,631 A | 1/1997 | Katoozi et al. |
| 2012/0176816 A1* | 7/2012 | Seel ................. H02M 7/4807 363/21.01 |

(Continued)

FOREIGN PATENT DOCUMENTS

| JP | 2016-149834 A | 8/2016 |
| JP | 6003932 B2 | 10/2016 |

OTHER PUBLICATIONS

Extended European search report dated Oct. 8, 2021, in corresponding European patent Application No. 19848541.9, 8 pages.
(Continued)

*Primary Examiner* — Thienvu V Tran
*Assistant Examiner* — Carlos O Rivera-Perez
(74) *Attorney, Agent, or Firm* — Xsensus LLP

(57) ABSTRACT

In a start-up control in which primary-side direct-current (DC) terminals and secondary-side DC terminals are charged by an external power supply outside a power conversion device, initially, one-side DC terminals are charged by the external power supply while switching operations of the primary-side bridge circuit and the secondary-side bridge circuit are stopped. Subsequently, a bridge circuit that is connected to the DC terminals not charged by the external power supply stops the switching operation and operates in a diode rectifying mode, while a bridge circuit that is connected to the DC terminals charged by the external power supply performs the switching operation and outputs an AC voltage whose voltage pulse width has been subjected to a variable control so that the voltage (Continued)

pulse width is smaller for a greater voltage difference of the charged DC terminals from the uncharged DC terminals.

20 Claims, 17 Drawing Sheets

(58) Field of Classification Search
CPC .. H02M 3/325; H02M 3/335; H02M 3/33507;
H02M 3/33515; H02M 3/33523; H02M
3/3353; H02M 3/33538; H02M 3/33546;
H02M 3/33553; H02M 3/33561; H02M
3/33569; H02M 3/33571; H02M 3/33573;
H02M 3/33576; H02M 3/33584; H02M
3/33592; H02M 1/0003; H02M 1/0009;
H02M 1/0025; H02M 1/0067; H02M
1/007; H02M 1/0074; H02M 1/0077;
H02M 1/08; H02M 1/081; H02M 1/082;
H02M 1/0083; H02M 1/36; H02M 7/00;
H02M 7/42; H02M 7/44; H02M 7/4815;
H02M 7/515; H02M 7/521; H02M 7/525;
H02M 7/527; H02M 7/529; H02M
7/5387
USPC ... 363/15–21.3, 21.04–21.18, 37, 40–43, 49,
363/65, 67, 71, 95, 97, 98, 123–127,
363/131–134; 323/138, 266, 271–275,
323/282–287, 299, 303, 321, 351, 901,
323/908
See application file for complete search history.

(56) References Cited

U.S. PATENT DOCUMENTS

| | | | |
|---|---|---|---|
| 2014/0103860 A1 | 4/2014 | Kominami et al. | |
| 2015/0138843 A1* | 5/2015 | Inoue | H02M 3/33584 363/21.01 |
| 2015/0263633 A1 | 9/2015 | Shono et al. | |
| 2015/0318778 A1 | 11/2015 | Gong et al. | |
| 2016/0043623 A1* | 2/2016 | Ortiz | H02M 3/33584 318/503 |
| 2016/0211766 A1 | 7/2016 | Malrait et al. | |
| 2018/0159424 A1* | 6/2018 | Kolar | H02M 1/36 |

OTHER PUBLICATIONS

International Search Report and Written Opinion dated Sep. 10, 2019, received for PCT Application No. PCT/JP2019/030019, Filed on Jul. 31, 2019, 8 pages including English Translation.

* cited by examiner

POWER CONVERSION DEVICE THAT PERFORMS DC-TO-DC CONVERSION

CROSS-REFERENCE TO RELATED APPLICATION

The present application is based on PCT filing PCT/JP2019/030019, filed Jul. 31, 2019, which claims priority to JP 2018-147497, filed Aug. 6, 2018, the entire contents of each are incorporated herein by reference.

TECHNICAL FIELD

The present disclosure relates to a power conversion device, and, more particularly, to a power conversion device that converts a direct-current (DC) power into a DC power, that is, performs DC-to-DC conversion.

BACKGROUND ART

In general, a DC-to-DC converter capable of bidirectional power transmission is applied to a photovoltaic system, electricity storage system, etc. In particular, a dual active bridge (DAB) DC-to-DC converter, since it connects alternating-current (AC) terminals of two full-bridge inverters via an inductance element, such as a reactor and a transformer, has a relatively simple structure and a symmetric circuit structure. Thus, the characteristics of the dual active bridge DC-to-DC converter in power transmission are equal in the both directions. Owing to these characteristics, DAB DC-to-DC converters are widely used.

In general, for the DAB DC-to-DC converter that is started up by receiving a power from one DC terminal, the other DC terminal is in a non-voltage state. Thus, there is the need to prevent generation of too much inrush current inside the DC-to-DC converter, in particular, at the inductance element.

Japanese Patent No. 6003932 (PTL 1) discloses a DAB power conversion device which performs a start-up control in which the inrush current is reduced by causing semiconductor switching elements, included in the upper arm of a full-bridge inverter, to operate in the active region.

CITATION LIST

Patent Literature

PTL 1: Japanese Patent No. 6003932

SUMMARY OF INVENTION

Technical Problem

However, the power conversion device disclosed in PTL 1 needs to have a gate driver voltage that is variable between the start-up control and a normal control subsequent to the start-up control, which may cause a concern for a complex circuit structure.

The present disclosure is made to solve such a problem, and an object of the present disclosure is to provide a DAB power conversion device that can be started up quickly and safely.

Solution to Problem

According to a certain aspect of the present disclosure, a power conversion device includes: a power converter to perform bidirectional DC-to-DC conversion between primary-side direct-current (DC) terminals and secondary-side DC terminals; and a controller to control operation of the power converter. The power converter includes a primary-side bridge circuit, a secondary-side bridge circuit, and an inductance element. The primary-side bridge circuit includes semiconductor switching elements and performs bidirectional DC-to-AC power conversion between the primary-side DC terminals and primary-side alternating-current (AC) terminals. The secondary-side bridge circuit includes semiconductor switching elements, and performs bidirectional DC-to-AC power conversion between the secondary-side DC terminals and secondary-side AC terminals. The inductance element is connected between the primary-side AC terminals and the secondary-side AC terminals. The controller performs a start-up control the primary-side DC terminals are charged to a predetermined voltage and the secondary-side DC terminals are charged to a predetermined voltage by an external power supply outside the power converter. In the start-up control, a charge control is performed in which one-side DC terminals, which are one of (i) the primary-side DC terminals and (ii) the secondary-side DC terminals, are charged, while switching operations of the primary-side bridge circuit and the secondary-side bridge circuit are stopped, and, subsequently, other-side DC terminals, which are the other one of (i) the primary-side DC terminals and (ii) the secondary-side DC terminals, are charged. In the charge control, an one-side bridge circuit connected to the one-side DC terminals performs a switching operation so as to output to the inductance element an AC voltage whose voltage pulse width has been subjected to a variable control, and an other-side bridge circuit connected to the other-side DC terminals stops a switching operation and operates in a diode rectifying mode, the one-side bridge circuit being one of the primary-side bridge circuit and the secondary-side bridge circuit, the other-side bridge circuit being the other one of the primary-side bridge circuit and the secondary-side bridge circuit. The controller controls the switching operation of the one-side bridge circuit so that the voltage pulse width is smaller for a greater voltage difference of the one-side DC terminals from the other-side DC terminals.

Advantageous Effects of Invention

According to the present disclosure, in the charge control in which the one-side DC terminals are charged and, after the completion of the charging, the other-side DC terminal are charged, the voltage pulse width of an AC voltage, supplied from the one-side bridge circuit via the inductance element to the other-side bridge circuit operating in the diode rectifying mode, is controlled so that the voltage pulse width is smaller for a greater voltage difference of the DC voltage of the one-side DC terminals (charged) from the DC voltage of the other-side DC terminals, thereby allowing the current value to be set, as appropriate, at the beginning of charging and while the charging is in progress. Thus, a DAB power conversion device can be started up quickly and safely.

DESCRIPTION OF EMBODIMENTS

Hereinafter, embodiments according to the present disclosure will be described in detail, with reference to the accompanying drawings. Note that, in the following, like reference sign is used to refer to like or corresponding parts, and the description thereof will, in principle, not be repeated.

Embodiment 1

Figure 1:
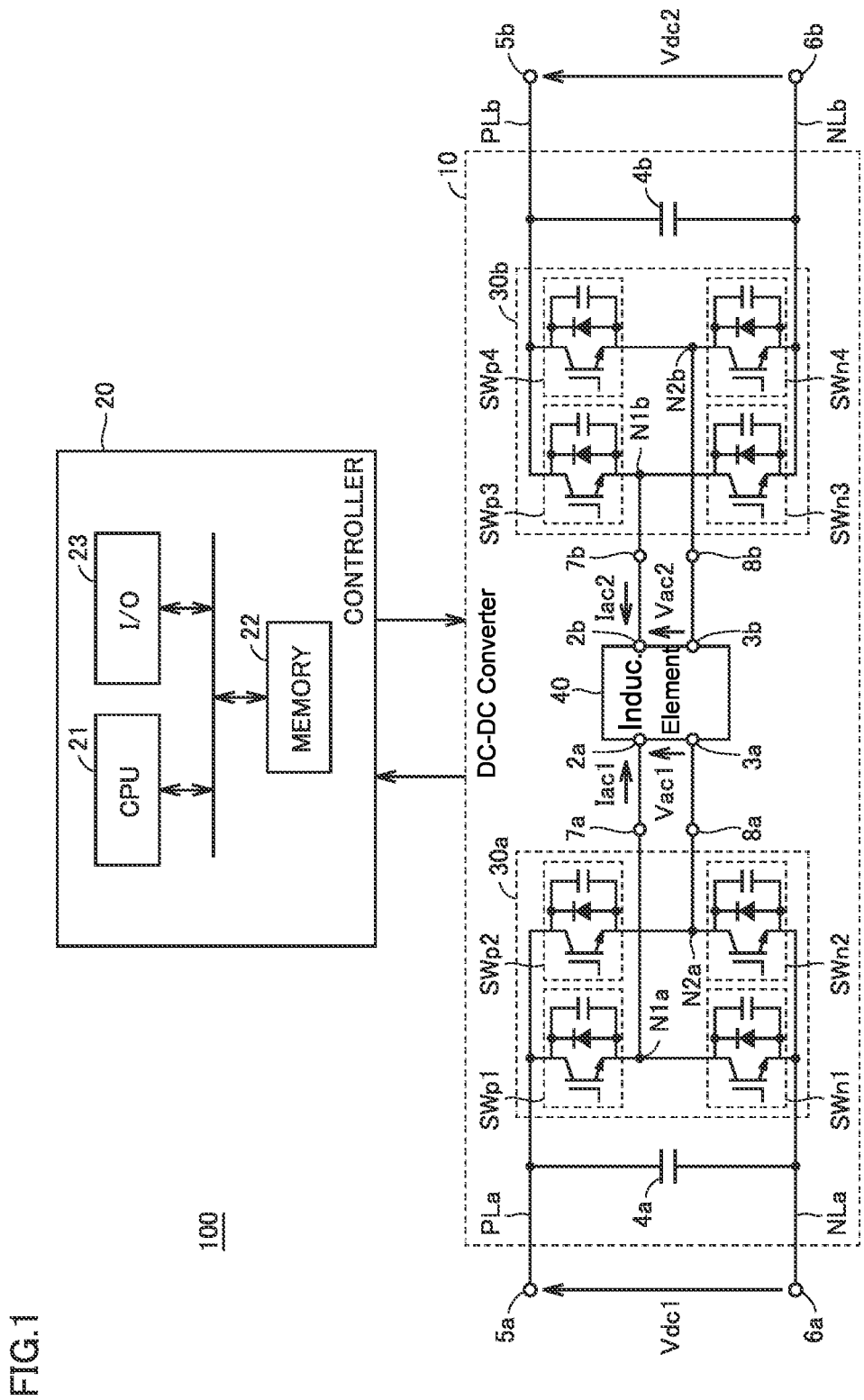
FIG. 1 is a circuit diagram illustrating a configuration of a power conversion device according to Embodiment 1.

FIG. 1 is a circuit diagram illustrating a configuration of a power conversion device 100 according to Embodiment 1.

Referring to FIG. 1, power conversion device 100 includes primary-side direct-current (DC) terminals 5a, 6a, a DC-to-DC converter 10, a controller 20 corresponding to a "controller," and secondary-side DC terminals 5b, 6b. DC-to-DC converter 10 performs power conversion (DC-to-DC conversion) between a primary-side DC voltage Vdc1 between the primary-side DC terminals 5a, 6a and a secondary-side DC voltage Vdc2 between the secondary-side DC terminals 5b, 6b.

Controller 20 controls the power conversion performed by DC-to-DC converter 10. For example, controller 20 can be configured of a microprocessor that includes a central processing unit (CPU) 21, a memory 22, and an input/output (I/O) circuit 23. I/O circuit 23 provides input of detection values obtained by sensors disposed on DC-to-DC converter 10, and output of control signals for the components included in DC-to-DC converter 10. A control device 200 is capable of implementing a control feature, described below, by software processing in which arithmetic processes according to programs stored in memory 22 are performed by CPU 21. Alternatively, control device 200 can implement some or all the control feature by hardware processing by a dedicated electronic circuit.

DC-to-DC converter 10 is a dual active bridge (DAB) DC-to-DC converter, and includes smoothing capacitors 4a, 4b, a primary-side bridge circuit 30a, a secondary-side bridge circuit 30b, and an inductance element 40.

The primary-side bridge circuit 30a has semiconductor switching elements SWp1, SWn1, SWp2, SWn2, which are connected between a power line PLa on the high-potential side of the primary-side bridge circuit 30a and a power line NLa on the low-potential side of the primary-side bridge circuit 30a so as to form a single-phase full bridge. Power lines PLa and NLa are connected to the primary-side DC terminals 5a and 6a, respectively. Smoothing capacitor 4a for stabilizing the primary-side DC voltage Vdc1 is connected between power line PLa and power line NLa.

Semiconductor switching elements SWp1 and SWn1 are connected in series between power line PLa and power line NLa via a node N1a connected to an alternating-current (AC) terminal 7a, the semiconductor switching elements SWp1 and SWn1 forming a first leg of DC-to-DC converter 10. Similarly, semiconductor switching elements SWp2 and SWn2 are connected in series between power line PLa and power line NLa via a node N2a connected to an AC terminal 8a, the semiconductor switching elements SWp2 and SWn2 forming a second leg of DC-to-DC converter 10.

Similarly, the secondary-side bridge circuit 30b has semiconductor switching elements SWp3, SWn3, SWp4, SWn4 connected between a power line PLb on the high-potential side of the secondary-side bridge circuit 30b and a power line NLb on the low-potential side of the secondary-side bridge circuit 30b so as to form a single-phase full bridge. Power lines PLb and NLb are connected to the secondary-side DC terminals 5b and 6b, respectively. Smoothing capacitor 4b for stabilizing the secondary-side DC voltage Vdc2 is connected between power line PLb and power line NLb.

Semiconductor switching elements SWp3 and SWn3 are connected in series between power line PLb and power line NLb via a node N1b connected to an AC terminal 7b, the semiconductor switching elements SWp3 and SWn3 forming a third leg of DC-to-DC converter 10. Similarly, semiconductor switching elements SWp4 and SWn4 are connected in series between power line PLb and power line NLb via a node N2b connected to an AC terminal 8b, the semiconductor switching elements SWp4 and SWn4 forming a fourth leg of DC-to-DC converter 10. In the first through fourth legs, semiconductor switching elements SWp1 through SWp4 each form an "upper arm," and semiconductor switching element SWn1 through SWn4 each form a "lower arm."

Figure 2:
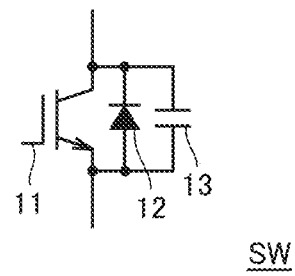
FIG. 2 is a circuit diagram illustrating an example configuration of a semiconductor switching element shown in FIG. 1.

FIG. 2 is a circuit diagram illustrating an example configuration of the semiconductor switching elements shown in FIG. 1. FIG. 2 shows an example configuration of a semiconductor switching element SW, which is comprehensive representation of semiconductor switching elements SWp1 through SWp4 and SWn1 through SWn4.

Referring to FIG. 2, semiconductor switching element SW has a self-turn off type switching element 11, a diode 12, and a snubber capacitor 13. Switching element 11 can be configured of any self-turn off type element, such as an IGBT (Insulated Gate Bipolar Transistor), a MOSFET ((Metal Oxide Semiconductor Field Effect Transistor), or a GCT (Gate Commutated Turn-off) thyristor. Diode 12 is connected in anti-parallel to switching element 11, forming a diode (FWD: free wheeling diode). Snubber capacitor 13 is connected in parallel to switching element 11.

Referring again to FIG. 1, inductance element 40 has primary-side AC terminals 2a, 3a connected to AC terminals 7a, 8a of the primary-side bridge circuit 30a, and secondary-side AC terminals 2b, 3b connected to AC terminals 7b, 8b of the secondary-side bridge circuit 30b.

Figure 3:
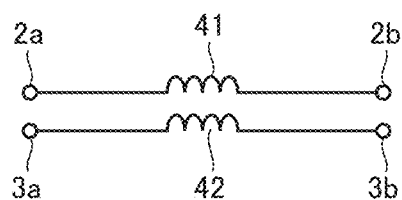
FIG. 3 is a circuit diagram illustrating a first example of an inductance element shown in FIG. 1.
Figure 4:
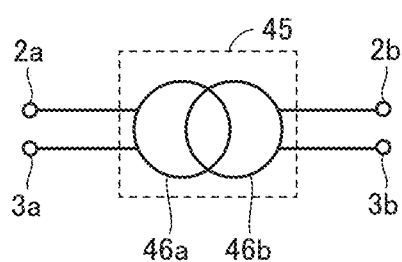
FIG. 4 is a circuit diagram illustrating a second example of the inductance element shown in FIG. 1.

FIGS. 3 and 4 each show an example configuration of inductance element 40.

Referring to FIG. 3, inductance element 40 can be configured of a reactor 41 connected between the primary-side AC terminal 2a and the secondary-side AC terminal 2b, and a reactor 42 connected between the primary-side AC terminal 3a and the secondary-side AC terminal 3b.

Alternatively, referring to FIG. 4, inductance element 40 can also be configured of a transformer 45 having a primary-side winding 46a connected to the primary-side AC terminals 2a and 3a and a secondary-side winding 46b connected to the secondary-side AC terminals 2b and 3b.

DC-to-DC converter 10, shown in FIGS. 1 through 4, converts, by the primary-side bridge circuit 30a, DC power input from the primary-side DC terminal 5a into AC power (a single-phase AC power in the example of FIG. 1), which is transmitted to the secondary-side bridge circuit 30b via inductance element 40. The secondary-side bridge circuit 30b converts the AC power, again, to DC power and transmits the DC power to the secondary-side DC terminals 5b, 6b. In this case, power is transmitted from the primary-side DC terminals 5a, 6a to the secondary-side DC terminals 5b, 6b.

Alternatively, due to the circuit being in symmetry, DC-to-DC converter 10 can also transmit power from the secondary-side DC terminals 5b, 6b to the primary-side DC terminals 5a, 6a. In this case, the DC power input to the secondary-side DC terminal 5b is converted into an AC power (the single-phase AC power in the example of FIG. 1) by the secondary-side bridge circuit 30b, and the AC power is transmitted to the primary-side bridge circuit 30a via inductance element 40. The primary-side bridge circuit 30a converts the AC power, again, to a DC power and transmits the DC power to the primary-side DC terminals 5a, 6a. In this way, power conversion device 100 is capable of free DC voltage conversion between the primary side and the secondary side. Power conversion device 100 is also capable of controlling of the direction of transmission of power, transmitting power both from the primary side to the secondary side and from the secondary side to the primary side.

Next, a power conversion control by controller 20 is described.

Figure 5:
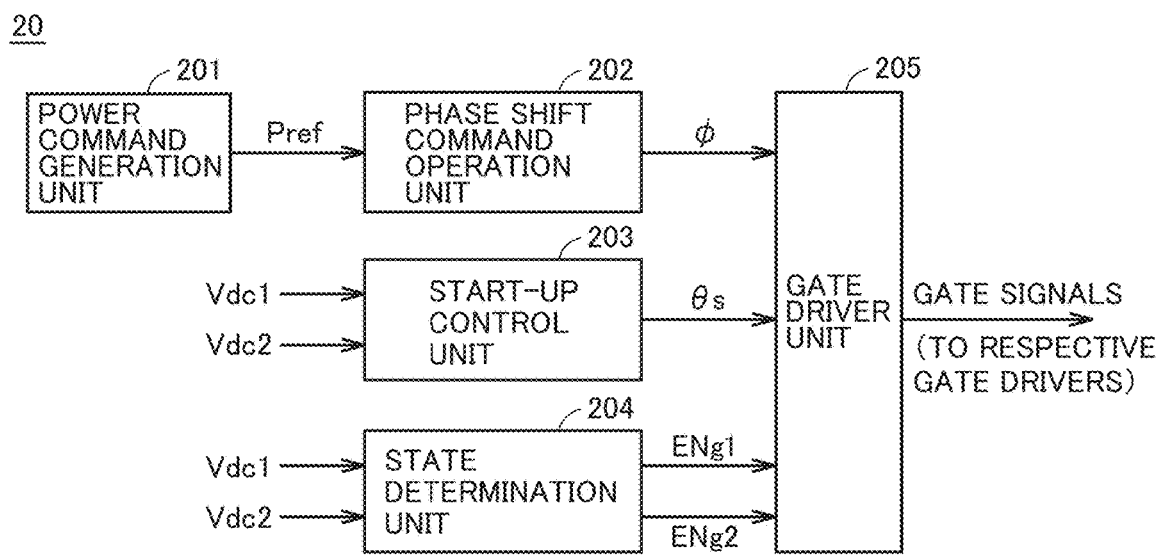
FIG. 5 is a block diagram illustrating a configuration of control performed by a controller included in the power conversion device according to Embodiment 1.

FIG. 5 is a block diagram illustrating a configuration of control performed by controller 20 included in the power conversion device according to Embodiment 1. The functionality of each block in the block diagram, including ones shown in FIG. 5, is implemented by at least one of software processing and hardware processing by controller 20.

Referring to FIG. 5, controller 20 includes a power command generation unit 201, a phase shift command operation unit 202, a start-up control unit 203, a state determination unit 204, and a gate driver unit 205.

To start up the DC-to-DC converter 10, initially, a start-up control is performed, in which the primary-side DC terminals 5a, 6a (including smoothing capacitor 4a) and the secondary-side DC terminals 5b, 6b (including smoothing capacitor 4b) are charged by the supply of power from outside the DC-to-DC converter 10 and the primary-side DC voltage Vdc1 and the secondary-side DC voltage Vdc2 are increased to the rated value. As state determination unit 204 determines that the start-up control by start-up control unit 203 has been completed, a normal control is initiated, in which the power is transmitted between the primary-side DC terminals 5a, 6a and the secondary-side DC terminals 5b, 6b. In the normal control, the power conversion by DC-to-DC converter 10 is controlled in accordance with a power command value Pref which is generated by power command generation unit 201.

Power command generation unit 201 generates power command value Pref for the normal control, according to a control mode of power conversion device 100. For example, power command value Pref is a positive value if power is transmitted from the primary side to the secondary side, and a negative value if power is transmitted from the secondary side to the primary side.

The control mode includes, for example, a first mode in which the primary-side DC voltage Vdc1 is controlled to the voltage command value (Vdc1*), a second mode in which the secondary-side DC voltage Vdc2 is controlled to a voltage command value (Vdc2*), and a third mode in which the power transmitted from the primary side to the secondary side or the power transmitted from the secondary side to the primary side is controlled.

For example, in the first mode, while the secondary-side DC voltage Vdc2 is under control by other power conversion device (not shown) connected to the secondary-side DC terminals 5b, 6b, power command generation unit 201 can calculate power command value Pref by PI operation or the like that is based on a voltage deviation between a detection value of the primary-side DC voltage Vdc1 and the voltage command value (Vdc1*).

Similarly, in the second mode, for example, while the primary-side DC voltage Vdc1 is under control by other power conversion device (not shown) connected to the primary-side DC terminals 5a, 6a, power command generation unit 201 can calculate power command value Pref by PI operation or the like that is based on a voltage deviation between a detection value of the secondary-side DC voltage Vdc2 and the voltage command value (Vdc2*).

In the third mode, for example, while the primary-side DC voltage Vdc1 and the secondary-side DC voltage Vdc2, respectively, are being controlled to a predetermined value by other power conversion device (not shown) connected to the primary-side DC terminals 5a, 6a and other power conversion device (not shown) connected to the secondary-side DC terminals 5b, 6b, power command value Pref is given directly from an upper control system of controller 20 to controller 20.

As can be understood from the above descriptions of the first to third modes, typically, an external power supply and a power conversion device (the other power conversion device mentioned above) for controlling at least one of the primary-side DC voltage Vdc1 and the secondary-side DC voltage Vdc2 are disposed for at least one of the primary-side DC terminals 5a, 6a and the secondary-side DC terminals 5b, 6b. While the start-up control described above is being performed, power is supplied from the external power supply to the power conversion device according to the present embodiment. After the control transitions from the start-up control to the normal control, power is exchanged between the external power supply and the power conversion device according to the present embodiment, under a selected control mode (e.g., any of the first to third modes).

Based on power command value Pref from power command generation unit 201, phase shift command operation unit 202 generates a command value (phase shift command value φ*) for a phase shift amount φ between the primary-side bridge circuit 30a and the secondary-side bridge circuit 30b, and issues the command value to gate driver unit 205. The functionality of phase shift command operation unit 202 can also be integrated with power command generation unit 201. In this case, the phase shift command φ is directly issued from power command generation unit 201 to gate driver unit 205.

In the normal control, gate driver unit 205 outputs gate signals for controlling on and off of semiconductor switching elements SWp1 through SWp4 and SWn1 through SWn4, in accordance with the command value for the phase shift amount φ issued from phase shift command operation unit 202. As each gate signal is input to a gate driver (not shown) included in a corresponding semiconductor switching element, on and off of semiconductor switching elements SWp1 through SWp4 and SWn1 through SWn4 are controlled in accordance with the command value for the phase shift amount φ.

Figure 6:
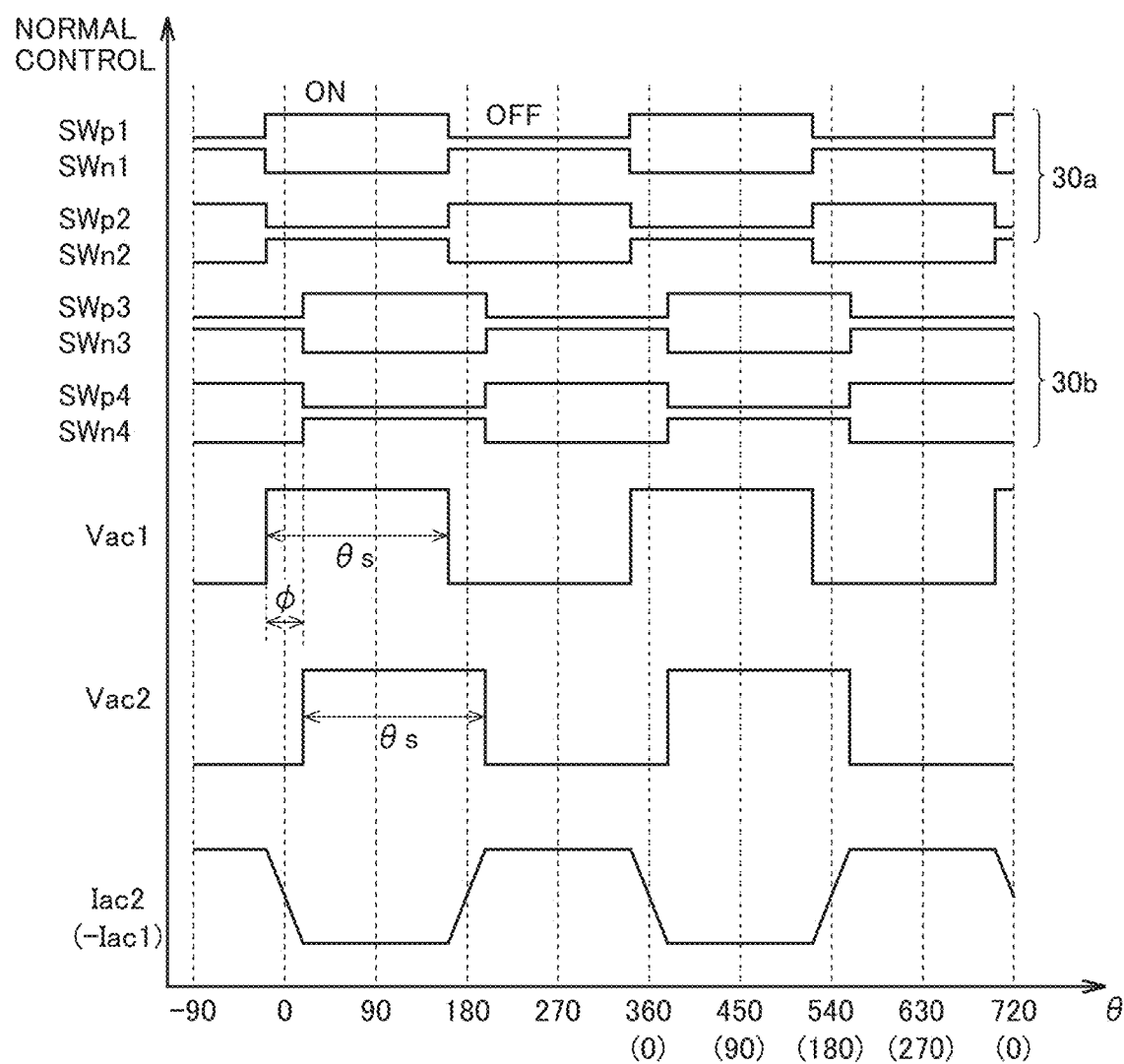
FIG. 6 shows example operating waveforms of a DC-to-DC converter while the power conversion device according to Embodiment 1 is under a normal control.

FIG. 6 shows example operating waveforms of DC-to-DC converter 10 during the normal control. FIG. 6 shows operation of DC-to-DC converter 10 having transformer 45 (FIG. 4) disposed as inductance element 40. The switching phase θ is indicated on the horizontal axis of FIG. 6, where each semiconductor switching element SW has a switching cycle of 360 degrees.

Referring to FIG. 6, in the primary-side bridge circuit 30a, semiconductor switching elements SWp1 and SWn1, included in the same leg, are turned on and off complementarily, and semiconductor switching elements SWp2 and SWn2 are also turned on and off complementarily in a similar manner. Furthermore, semiconductor switching elements SWn1 and SWp2 are turned on and off in phase, and semiconductor switching elements SWp1 and SWn2 are turned on and off in phase. This switches on and off of semiconductor switching elements SWn1, SWn2, SWp1, SWp2 for every ½(π) the switching cycle.

Similarly, in the secondary-side bridge circuit 30b, semiconductor switching elements SWp3 and SWn3, included in the same leg, are turned on and off complementarily, and semiconductor switching elements SWp4 and SWn4 are also turned on and off complementarily in a similar manner. Furthermore, semiconductor switching elements SWn3 and SWp4 are turned on and off in phase, and semiconductor switching elements SWp3 and SWn4 are turned on and off in phase. In the secondary-side bridge circuit 30b also, on and off of semiconductor switching elements SWn3, SWn4, SWp3, SWp4 switch for every ½(π) the switching cycle.

Phase shift amount φ (0≤φ≤π) is provided between when on and off of semiconductor switching elements SWn1, SWn2, SWp1, SWp2 switch in the primary-side bridge circuit 30a and when on and off of semiconductor switching elements SWn3, SWn4, SWp3, SWp4 switch in the secondary-side bridge circuit 30b.

Such on and off control of semiconductor switching elements SWn1, SWp1 through SWn4, SWp4 in the primary-side bridge circuit 30a and the secondary-side bridge circuit 30b generates an AC voltage Vac1 between the primary-side AC terminals 2a and 3a (the opposing ends of the primary-side winding 46a) of inductance element 40, and an AC voltage Vac2 between the secondary-side AC terminals 2b and 3b (the opposing ends of the secondary-side winding 46b) of inductance element 40. Such control also causes an AC current Iac2 to flow through the secondary-side winding 46b and AC current Iac1, which is in antiphase with AC current Iac2, to flow through the primary-side winding 46a (Iac1=−Iac2).

AC voltages Vac1, Vac2 each have a voltage pulse width θs in accordance with the on-period length of the semiconductor switching elements SWn1, SWp1 through SWn4, SWp4 (0≤θs≤π). A phase difference in accordance with the phase shift amount φ is caused between AC voltages Vac1 and Vac2. Since AC currents Iac1, Iac2 change in accordance with the phase shift amount φ, the power transmitted between the primary side and the secondary side changes too.

For example, a power P transmitted between the primary side and the secondary side is represented by the following Equation (1):

$$P = Vdc1 \cdot Vdc2/(2\pi^2 \cdot fsw \cdot L) \cdot \varphi \cdot (\pi - \varphi) \quad (1)$$

where fsw denotes a switching frequency of the semiconductor switching element SW, L denotes an inductance component of transformer 45, and φ denotes a phase shift amount.

In the normal control, φ>>π. Thus, Equation (1) is rearranged to the following Equation (2):

$$P = Vdc1 \cdot Vdc2 \cdot \varphi/(2\pi \cdot fsw \cdot L) \quad (2)$$

Accordingly, phase shift command operation unit 202 can calculate the command value for the phase shift amount (p from power command value Pref, according to the following Equation (3):

$$\varphi = Pref \cdot (2\pi \cdot fsw \cdot L)/(Vdc1 \cdot Vdc2) \quad (3)$$

As such, in the normal control, the power transmitted between the primary side and the secondary side can be controlled in accordance with power command value Pref by providing the phase shift amount φ (FIG. 6) that is set in accordance with power command value Pref.

Next, the start-up control for DC-to-DC converter 10 is described.

Referring again to FIG. 5, based on the primary-side DC voltage Vdc1 and the secondary-side DC voltage Vdc2, start-up control unit 203 variably controls voltage pulse width θs during the start-up control.

Figure 7:
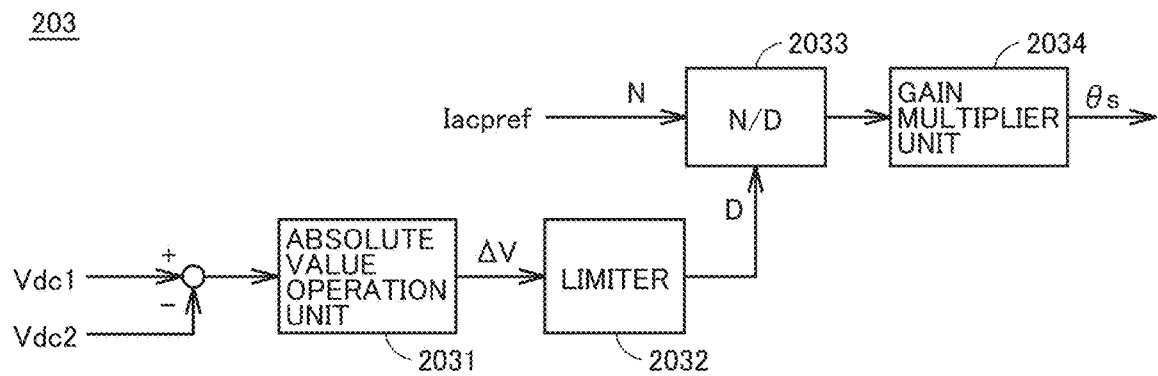
FIG. 7 is a block diagram illustrating details of the configuration of a start-up control unit shown in FIG. 5.

FIG. 7 is a block diagram illustrating further details of the configuration of control performed by start-up control unit 203.

Referring to FIG. 7, start-up control unit 203 includes an absolute value operation unit 2031, a limiter 2032, a divider unit 2033, and a gain multiplier unit 2034.

Absolute value operation unit 2031 calculates a voltage difference (absolute value) ΔV between the primary-side DC voltage Vdc1 and the secondary-side DC voltage Vdc2 (ΔV=|Vdc1−Vdc2|).

In order to prevent the denominator input to the subsequent divider unit 2033 from being zero, limiter 2032 sets a lower limit Vmin for voltage difference ΔV. Specifically, if ΔV≥Vmin, limiter 2032 outputs ΔV, as is, to a node D of divider unit 2033, and, if ΔV<Vmin, outputs ΔV satisfying ΔV=Vmin.

Divider unit 2033 outputs a value (N/D) that is obtained by dividing AC current peak command value Iacpref input to node N by voltage difference ΔV input to node D via limiter 2032. AC current peak command value Iacpref can be predetermined so as to be less than an allowed current value for semiconductor switching element SW and inductance element 40 (transformer 45), for example.

Gain multiplier unit 2034 multiplies the division value output from divider unit 2033 by gain α, thereby calculating voltage pulse width θs during the start-up control. In other words, voltage pulse width θs is calculated according to the following Equation (4):

$$\theta s = \alpha \cdot Iacpref / \Delta V \quad (4)$$

where gain α can be determined as α=2π·fsw·L, using fsw and L that are commonly used in Equations (1) through (3).

Referring again to FIG. 5, based on the primary-side DC voltage Vdc1, state determination unit 204 determines whether the primary-side bridge circuit 30a can perform the switching operation in the normal control. Specifically, as the primary-side DC voltage Vdc1 increases higher than a predetermined determination voltage, state determination unit 204 determines that the switching operation can be performed in the normal control, and sets a switching permit signal ENg1 for the primary-side bridge circuit 30a to "1." If the primary-side DC voltage Vdc1 is lower than the determination voltage, in contrast, state determination unit 204 determines that the switching operation cannot be performed in the normal control, and sets ENg1="0."

Similarly, based on the secondary-side DC voltage Vdc2, state determination unit 204 determines whether the secondary-side bridge circuit 30b can perform the switching operation in the normal control. Specifically, as the secondary-side DC voltage Vdc2 increases higher than a predetermined determination voltage, state determination unit 204 determines that the switching operation can be performed in the normal control, and sets a switching permit signal ENg2 for the secondary-side bridge circuit 30b to "1". If the secondary-side DC voltage Vdc2 is lower than the determination voltage, in contrast, state determination unit 204 determines that the switching operation cannot be performed in the normal control, and sets ENg2="0." DC-to-DC converter 10 does not initiate the normal control until ENg1=ENg2="1" holds true. A determination voltage that is used for generation of switching permit signals ENg1, ENg2 can be determined in accordance with the rated values of the primary-side DC voltage Vdc1 and the secondary-side DC voltage Vdc2.

Gate driver unit 205 receives the command value for the phase shift amount φ from phase shift command operation unit 202, the command value for voltage pulse width θs from start-up control unit 203, switching permit signal ENg1 for the primary-side bridge circuit 30a, and switching permit signal ENg2 for the secondary-side bridge circuit 30b, and outputs respective gate signals for semiconductor switching elements SWp1 through SWp4 and SWn1 through SWn4.

If ENg1 and ENg2 are both "1," gate driver unit 205 performs the normal control. As described above, in the normal control, the respective gate signals for semiconductor switching elements SWp1 through SWp4 and SWn1 through SWn4 are output so that voltage pulse width θs=π is fixed and the phase shift amount φ calculated by phase shift command operation unit 202 is imparted. This allows the power transmission between the primary-side DC terminals 5a, 6a and the secondary-side DC terminals 5b, 6b to be controlled in accordance with power command value Pref that is set depending on a control mode described above.

Figure 8:
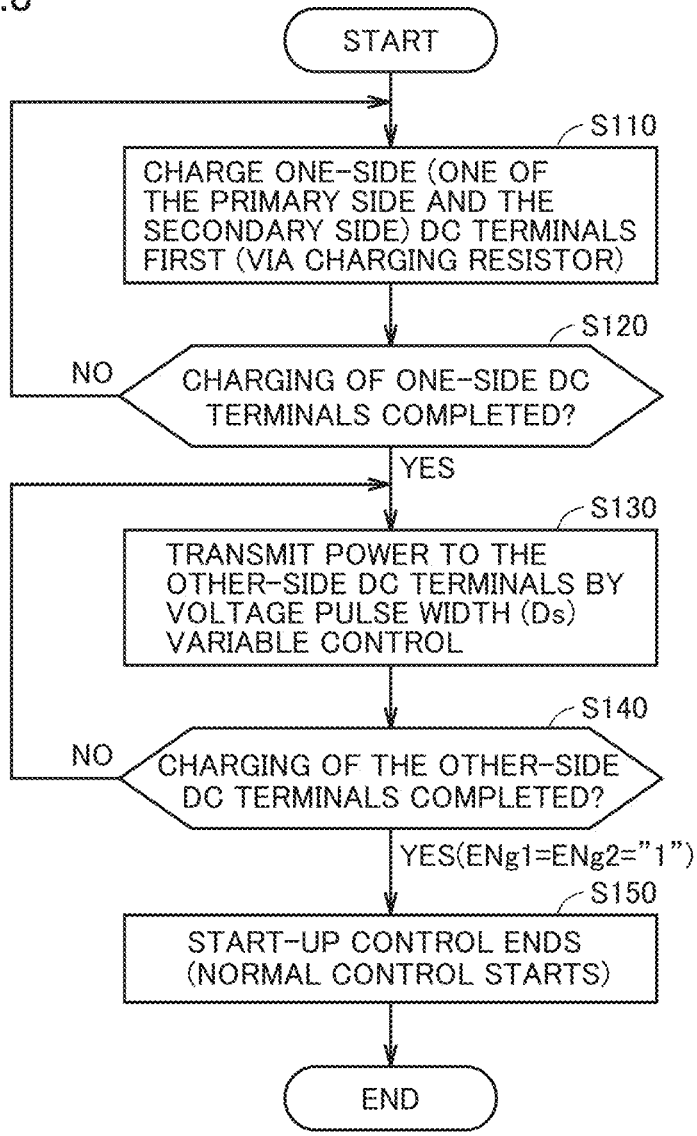
FIG. 8 is a flowchart illustrating a control process in a start-up control for the power conversion device according to Embodiment 1.

In contrast, in order to start up the DC-to-DC converter 10 from a state in which the primary-side DC terminals 5a, 6a and the secondary-side DC terminals 5b, 6b are not charged, the start-up control in accordance with the flowchart shown in FIG. 8 is performed.

FIG. 8 is a flowchart illustrating a control process in the start-up control performed by the power conversion device according to Embodiment 1. The control process illustrated in FIG. 7 is performed by controller 20 to start up the power conversion device 100.

Referring to FIG. 8, if ENg1=ENg2="0" when power conversion device 100 is to be started up, controller 20, in Step (hereinafter, simply denoted as "S") 110, charges the DC terminals on one of the primary side and the secondary side with an external power supply not shown (e.g., "other power conversion device" described above). In the following, description will be given that the secondary-side DC terminals 5b, 6b are charged prior to the primary-side DC terminals 5a, 6a. In S110, in order to prevent too much inrush current, the secondary-side DC terminals 5b, 6b are charged via a discharge resistor not shown. This gradually increases the DC voltage (Vdc2) of the secondary-side DC terminals 5b, 6b (on the one side) to be charged. In S110, the switching operation of the primary-side bridge circuit 30a and the secondary-side bridge circuit 30b are stopped. In other words, semiconductor switching elements SWp1 through SWp4 and SWn1 through SWn4 are fixed to off.

In S120, controller 20 determines whether the charging of the secondary-side DC terminals 5b, 6b to be charged has been completed. For example, S120 is YES if switching permit signal ENg2 based on the secondary-side DC voltage Vdc2 is "1." While ENg2="0," the charging of the secondary-side DC terminals 5b, 6b (on the one side) by the external power supply in S110 continues, and controller 20 waits to proceed to S130.

If the charging of the secondary-side DC terminals 5b, 6b on the one side has been completed (if YES in S120), controller 20, in S130, charges the primary-side DC terminals 5a, 6a on the other side by a charge control that is performed in accordance with the command value for voltage pulse width θs calculated by start-up control unit 203 (hereinafter, also referred to as "θs variable control"). In S130 also, the supply of power from the external power supply to the one-side DC terminals continues. Thus, the fact is described here in a confirming manner that the voltage of the secondary-side DC terminals 5b, 6b, having charged prior to the primary-side DC terminals 5a, 6a, (the secondary-side DC voltage Vdc2) is maintained at ENg2="1."

Figure 9:
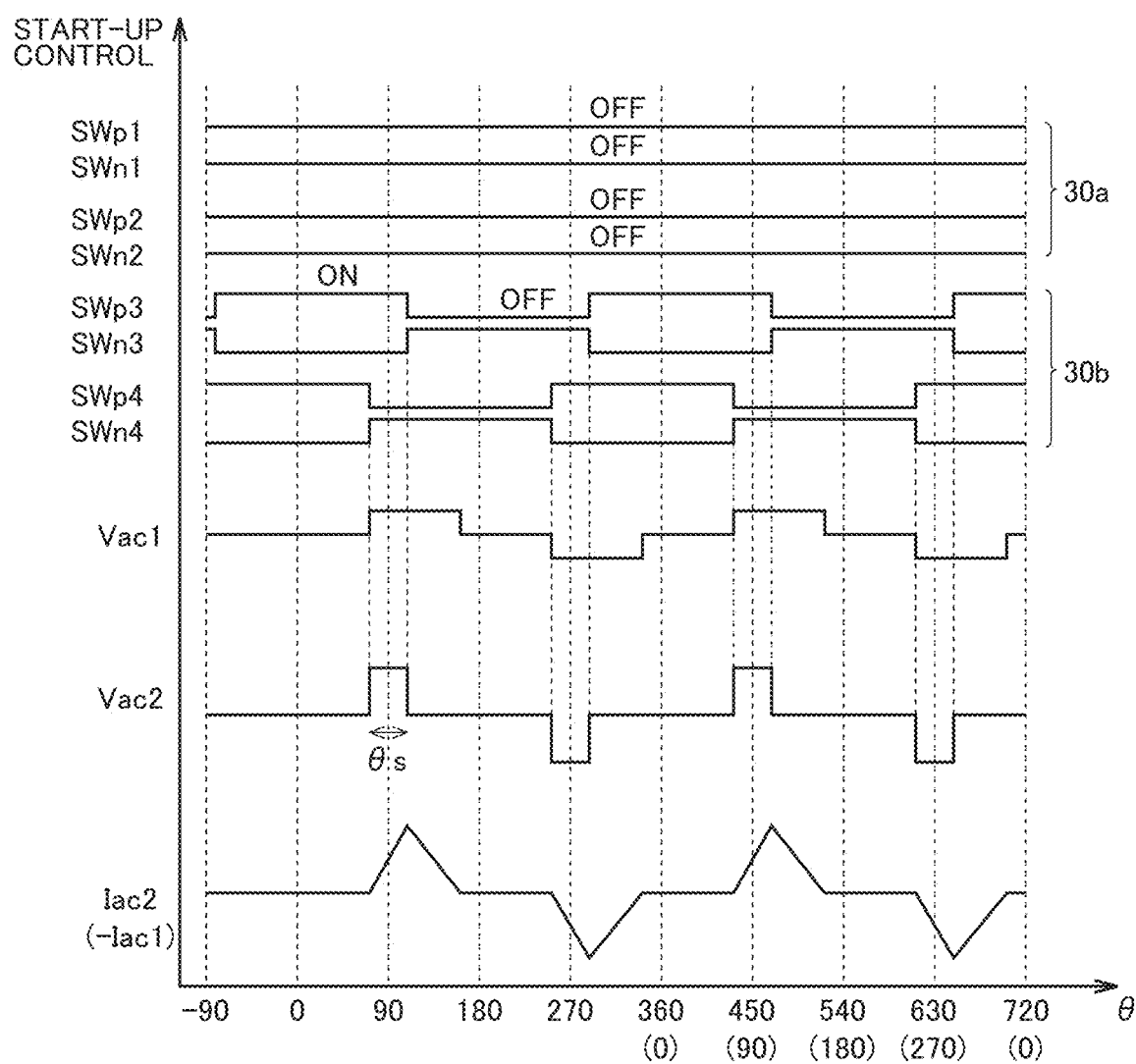
FIG. 9 shows example operating waveforms of the DC-to-DC converter in θs variable control during the start-up control.

FIG. 9 shows example operating waveforms of the DC-to-DC converter in the θs variable control during the start-up control. The same switching phase θ as shown in FIG. 6 is indicated on the horizontal axis of FIG. 9.

Referring to FIG. 9, during the θs variable control, power is transmitted from the charged one-side DC terminals (here, the secondary-side DC terminals 5b, 6b) to the uncharged other-side DC terminals (here, the primary-side DC terminals 5a, 6a).

Gate driver unit 205 generates respective gate signals for semiconductor switching elements SWp3, SWn3, SWp4, SWn4 of the secondary-side bridge circuit 30b connected to the charged secondary-side DC terminals 5b, 6b so that voltage pulse width θs calculated by start-up control unit 203 is generated in AC voltage Vac2. AC voltage Vac2 output from the secondary-side bridge circuit 30b is conveyed to the primary-side bridge circuit 30a by inductance element 40 (transformer 45) (AC voltage Vac1).

The switching operation of the primary-side bridge circuit 30a that is connected to the uncharged primary-side DC terminals 5a, 6a, is stopped and semiconductor switching elements SWp1, SWn1, SWp2, SWn2 are fixed to off. Accordingly, the primary-side bridge circuit 30a operates in a diode rectifying mode. As a result, the other-side primary-side DC terminals 5a, 6a are charged with a DC voltage that is obtained by rectifying AC voltage Vac1 by diodes 12 (FIG. 2) included in semiconductor switching elements SWp1, SWn1, SWp2, SWn2.

Referring again to FIG. 8, in S140, controller 20 determines whether the charging of the primary-side DC terminals 5a, 6a performed in S130 has been completed. For example, S140 is YES if switching permit signal ENg1 based on the primary-side DC voltage Vdc1 is "1." While ENg2="0," the primary-side DC terminals 5a, 6a (on the other side) are being charged, and thus the θs variable control initiated in S130 continues.

Start-up control unit 203 (FIG. 7) variably controls voltage pulse width θs in the θs variable control so that the greater the voltage difference ΔV of the charged DC terminals (here, the secondary-side DC terminals 5b, 6b) from the other-side DC terminals to be charged (here, the primary-side DC terminals 5a, 6a), the less the θs is. Stated differently, start-up control unit 203 variably controls voltage pulse width θs inversely proportional to voltage difference ΔV.

As a result, since the primary-side DC voltage Vdc1=0 holds true at the start of the θs variable control, voltage difference ΔV calculated by absolute value operation unit 2031 (FIG. 7)=Vdc2, and the command value for voltage pulse width θs calculated by start-up control unit 203 takes the minimum value during the θs variable control. Moreover, as the charging of the primary-side DC terminals 5a, 6a when the primary-side bridge circuit 30a is in the diode rectifying mode proceeds and the primary-side DC voltage Vdc1 increases, voltage difference ΔV=|Vdc1−Vdc2| gradually decreases. In response to voltage difference ΔV decreasing, the command value for voltage pulse width θs calculated by start-up control unit 203 gradually increases.

Note that start-up control unit 203 of FIG. 7 variably controls voltage pulse width θs inversely proportional to voltage difference ΔV by dividing a constant AC current peak command value Iacpref by voltage difference ΔV so that the AC current in accordance with AC current peak command value Iacpref is generated over a continuous period of time through the θs variable control. Moreover, absolute value operation unit 2031 calculates the absolute value of the difference between the primary-side DC voltage Vdc1 and the secondary-side DC voltage Vdc2, thereby calculating, by a common operation, voltage difference ΔV of the charged DC terminals from the other-side DC terminals to be charged, regardless of whether either one of (i) the primary-side DC terminals 5a, 6a and (ii) the secondary-side DC terminals 5b, 6b is charged by the start-up control prior to the other.

Furthermore, as the charging of the primary-side DC terminals 5a, 6a proceeds and the primary-side DC voltage Vdc1 increases to the determination voltage (the rated value), voltage difference ΔV≈0 holds true, thereby yielding the command value for voltage pulse width θs being the maximum (θs=π). At this stage, if S140 is YES, the process proceeds to S150 and the start-up control ends.

At the end of the start-up control, switching permit signal ENg1=ENg2="1" holds true. Subsequently, gate driver unit 205 generates gate signals according to the normal control described above. As described above, in the normal control, voltage pulse width θs is fixed (θs=π), and the power transmission between the primary-side DC terminals 5a, 6a and the secondary-side DC terminals 5b, 6b is controlled in accordance with the phase shift amount φ based on power command value Pref.

As described above, according to power conversion device 100 of Embodiment 1, the power converter can be promptly started up by charging the primary-side DC terminals 5a, 6a and the secondary-side DC terminals 5b, 6b one after another, without allowing too much current to flow through inductance element 40.

Note that voltage pulse width θs during the start-up control can also be calculated by start-up control unit 203 that has a configuration different from that of start-up control unit 203 illustrated in FIG. 7. For example, a look up table can be created, which predefines a correspondence between voltage pulse width θs and the combination of the primary-side DC voltage Vdc1 and the secondary-side DC voltage Vdc2. In this case, voltage pulse width θs can be set by reference to the lookup table, using the detection values of Vdc1, Vdc2 obtained at a moment the process of S130 is performed.

In other words, voltage pulse width θs in the θs variable control after the completion of charging of the one-side DC terminals is increased depending on the progress of charging of the other-side DC terminals, thereby achieving both the prevention of generation of too much initial current and the completion of start-up of the DAB power conversion device by prompt completion of the charging of the one-side DC terminals and the other-side DC terminals.

Moreover, for ease of explanation, the description is given above with reference to inductance element 40 being configured of transformer 45 having a winding turns ratio of 1:1. However, when the winding turns ratio Ntr=N1/N2 is not equal to 1, the winding turns ratio Ntr needs to be reflected to the computations of voltage difference ΔV and the command value for voltage pulse width θs, as appropriate.

Embodiment 2

Embodiment 1 has been described with reference to calculating the command value for voltage pulse width θs using both the primary-side DC voltage Vdc1 and the secondary-side DC voltage Vdc2. However, a so-called self-feeding configuration reserving the operating power for a detection device, the gate drive circuit, etc. supplied from DC-to-DC converter 10, may be applied to the power conversion device applied to a power system.

In the self-feeding configuration, it is difficult to accurately detect the DC voltage of the other-side direct-current (DC) terminals according to Embodiment 1, that is, the DC terminals that are charged after the one-side DC terminals, until the completion of the charging of the other-side DC terminals. Accordingly, in order to handle such a case, Embodiment 2 will be described with reference to another example of calculation of the command value for voltage pulse width θs in the θs variable control during the start-up control. Note that, as with Embodiment 1, Embodiment 2 will also be described with reference to a start-up control in which the secondary-side DC terminals 5b, 6b are charged by an external power supply, and the primary-side DC terminals 5a, 6a are subsequently charged via the primary-side bridge circuit 30a and the secondary-side bridge circuit 30b.

A current detector is disposed on an inductance element 40, thereby allowing detection of an alternating-current (AC) current Iac1 on the primary side of inductance element 40 (e.g., transformer 45) and an AC current Iac2 on the secondary side of inductance element 40. A controller 20 can obtain the detection values of AC currents Iac1, Iac2, based on an output of the current detector.

Note that in the start-up control of power conversion device 100 having the self-feeding configuration, charging of the secondary-side DC terminals 5b, 6b has been completed at the time the θs variable control is initiated. Thus, the secondary-side DC voltage Vdc2 and AC current Iac2 can be detected on the secondary side (on the one side) of power conversion device 100. In contrast, since the primary-side DC terminals 5a, 6a are not charged yet, the primary-side DC voltage Vdc1 and AC current Iac1 on the primary side (on the other side) of power conversion device 100 cannot be used for the calculation of the command value for voltage pulse width θs.

Figure 10:
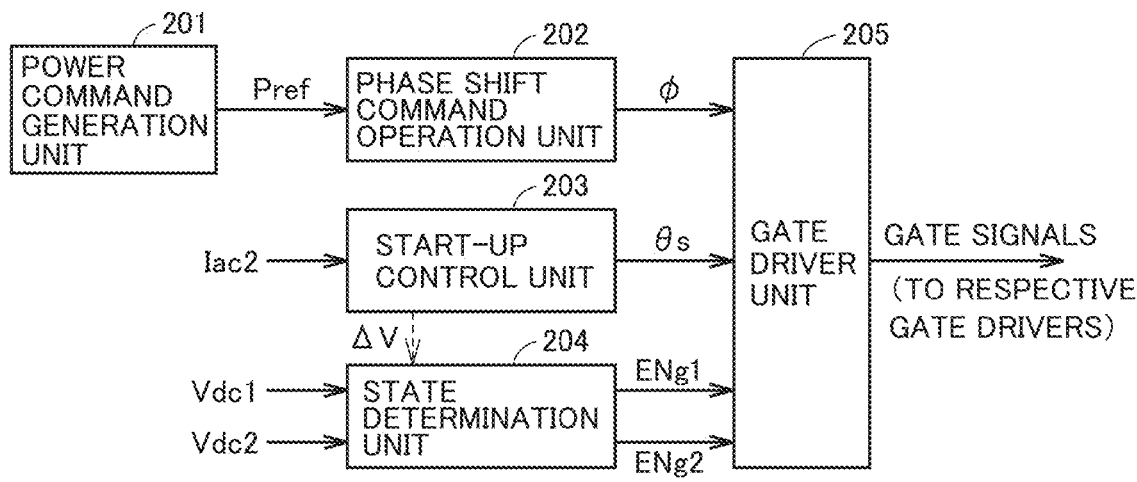
FIG. 10 is a block diagram illustrating a configuration of control performed by a controller included in a power conversion device according to Embodiment 2.

FIG. 10 is a block diagram illustrating a configuration of control performed by controller 20 included in the power conversion device according to Embodiment 2.

Comparing FIG. 10 with FIG. 5, unlike Embodiment 1, the primary-side DC voltage Vdc1 on the other side of power conversion device 100 according to Embodiment 2 is not detectable during the start-up control. For this reason, in Embodiment 2, a detection value of AC current Iac2 on the secondary side of inductance element 40, which is charged prior to the primary side, is input to start-up control unit 203. In other words, in Embodiment 2, start-up control unit 203 calculates the command value for voltage pulse width θs, based on AC current Iac2 on the one side of inductance element 40.

Figure 11:
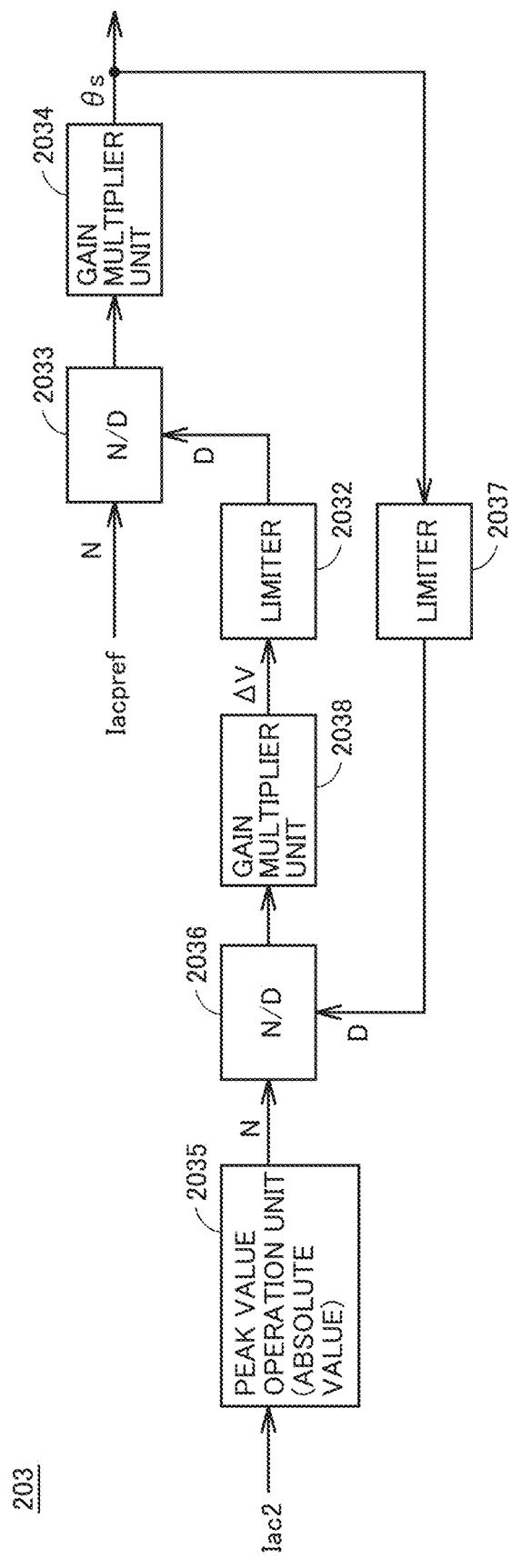
FIG. 11 is a block diagram illustrating details of the configuration of a start-up control unit shown in FIG. 10.

FIG. 11 shows a block diagram illustrating details of the configuration of start-up control unit 203 included in the power conversion device according to Embodiment 2.

Referring to FIG. 11, start-up control unit 203 includes a limiter 2032, a divider unit 2033, and a gain multiplier unit 2034, which are the same as those of FIG. 5, and a peak value operation unit 2035, a divider unit 2036, a limiter 2037, and a gain multiplier unit 2038.

Considering that fact that Vdc1=0 holds true on the secondary side of inductance element 40 at the time of starting up of the power conversion device, ΔV=L·di/dt is met for voltage difference ΔV (ΔV=|Vdc1−Vdc2|). Furthermore, since Iac=0 holds true at the time of start-up, di=|Iac2p| can be achieved, using the peak value (maximum) of AC current Iac2.

Moreover, dt corresponds to the voltage pulse width, and thus is indicated by the following Equation (5), using a switching cycle Tsw which is the inverse of switching frequency fsw of semiconductor switching element SW:

$$dt = Tsw \cdot \theta s / (2\pi) \quad (5)$$

Accordingly, Equation (6) holds true for ΔV.

$$\Delta V = L \cdot |Iac2p|/dt = L \cdot |Iac2p| \cdot 2\pi fsw/\theta s = (2\pi \cdot fsw \cdot L) \cdot |Iac2p|/\theta s \quad (6)$$

In other words, using gain β (β=(2π·fsw·L), voltage difference ΔV as with Embodiment 1 can be determined by the operation of ΔV=β·|Iac2p|/θs. Note that gain β is indicated by the same expression as gain α expressed in Equation (4) and thus gains α, β can be a common value. However, gains α, β can also be individually adjusted as separate gain values.

Peak value operation unit 2035 receives the detection value of AC current Iac2, extracts a peak value of AC current Iac2, and outputs the absolute value of the peak value, that is, |Iac2p|. Divider unit 2036 outputs a value (N/D) obtained by dividing |Iac2| input to node N by the voltage pulse width input to the node D via limiter 2037.

In order to prevent the denominator input to divider unit 2036 from being zero, limiter 2037 sets a lower limit θmin for voltage pulse width θs. Specifically, if θs≥θmin, limiter 2037 outputs θs, as is, to a node D of divider unit 2036, and, if θs<θmin, outputs θs satisfying θs=θmin.

Gain multiplier unit 2038 multiplies the division value output from divider unit 2036 by gain β, thereby calculating voltage difference ΔV. It is understood that voltage difference ΔV is an estimate that is calculated without using the detection value of the primary-side DC voltage Vdc1. For voltage difference ΔV, voltage pulse width θs during the start-up control is calculated according to Equation (4), in common with the operation of Embodiment 1 (FIG. 5).

Voltage pulse width θs, output from gain multiplier unit 2034, passes through limiter 2037 and is used to calculate voltage difference ΔV. In particular, at the start of the start-up control, θs=θ0 is fixed for a period of time in order to reduce an error in estimation of voltage difference ΔV, where θ0 is a predetermined constant value (θ0≥θmin). Fixing θs for a period of time can reduce false detection of a peak of AC current Iac2, thereby improving the accuracy in estimation of voltage difference ΔV.

The primary-side DC voltage Vdc1 can be estimated also by using voltage difference ΔV and the secondary-side DC voltage Vdc2 which is detectable. Specifically, during the θs variable control, ΔV=Vdc2−Vdc1 is met based on Vdc2>Vdc1. Thus, an estimate of the primary-side DC voltage Vdc1 can be calculated also by subtracting voltage difference ΔV from a detection value of the secondary-side DC voltage Vdc2 (Vdc1=Vdc2−ΔV).

With the power conversion device according to Embodiment 2, the start-up control can also be performed according to the flowchart of FIG. 8, provided that voltage pulse width θs in the θs variable control is calculated in S130 according to the configurations shown in FIGS. 10 and 11, which is a difference of Embodiment 2 from Embodiment 1. Moreover, the completion of charging of the primary-side DC terminals 5a, 6a on the other side can be determined in S140 directly based on the detection value of the primary-side DC voltage Vdc1, and also determined based on an estimate of the primary-side DC voltage Vdc1 which is calculated from the above-described estimate of voltage difference ΔV and the secondary-side DC voltage Vdc2 (on the one side).

The process of charging of the secondary-side DC terminals 5b, 6b in S110, S120 prior to the primary-side DC terminals 5a, 6a, and the start-up control end process (S150) performed in Embodiment 2 are the same as Embodiment 1.

As described above, in the start-up control in which the primary-side DC terminals 5a, 6a and the secondary-side DC terminals 5b, 6b are charged one after another, the power conversion device according to Embodiment 2 is capable of performing the same start-up control as Embodiment 1, without the use of the detection values of the DC voltages of the DC terminals that is charged following the prior charging. Accordingly, as with Embodiment 1, the power conversion device having the self-feeding configuration can promptly complete the start-up of the power converter, without allowing too much current to flow into components included in the power converter, including inductance element 40.

Embodiment 3

In Embodiment 3, a description is given with respect to a switching control performed by a bridge circuit for achieving a voltage pulse width θs calculated by a start-up control unit 203. As with Embodiments 1 and 2, in Embodiment 3, the secondary-side direct-current (DC) terminals 5b, 6b (on the one side) are charged, and the primary-side DC terminals 5a, 6a (on the other side) are subsequently charged through a switching operation (θs variable control) performed by a secondary-side bridge circuit 30b.

Figure 12:
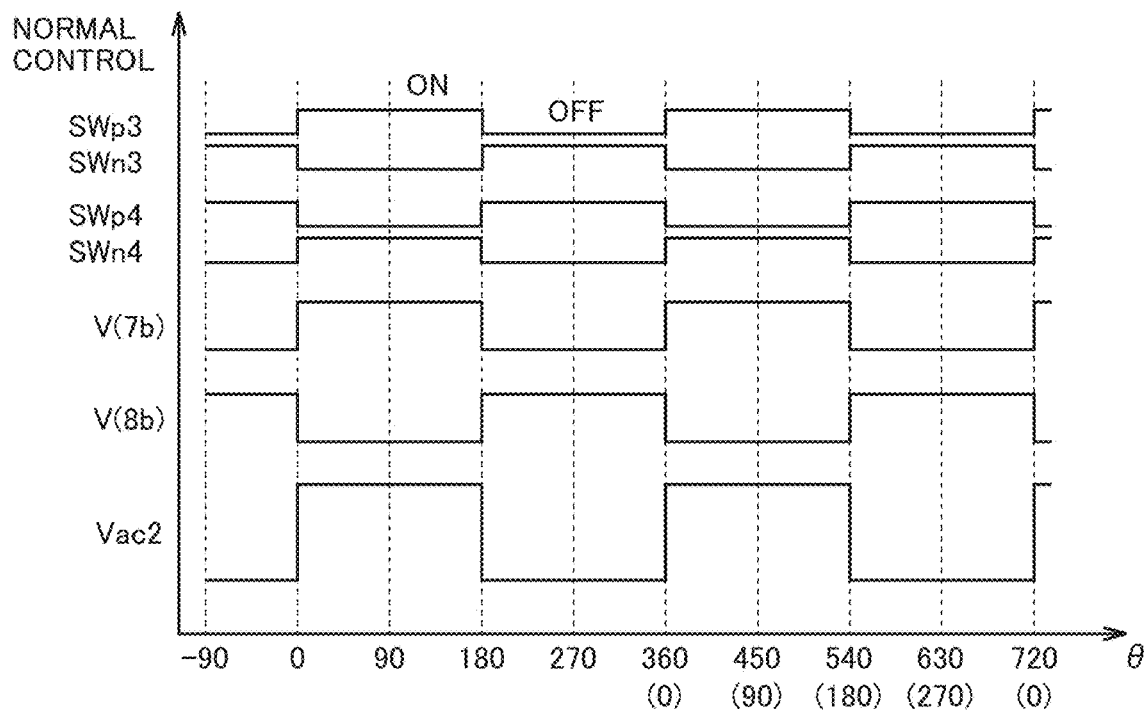
FIG. 12 is an operating waveform diagram illustrating a switching pattern of a bridge circuit during a normal control.

FIG. 12 shows an operating waveform diagram illustrating a switching pattern of the bridge circuit, which performs the θs variable control, during a normal control. FIG. 12 shows a switching pattern of the secondary-side bridge circuit 30b. A switching phase θ is indicated on the horizontal axis of FIG. 12, where each semiconductor switching element SW has a switching cycle of 360 degrees.

Referring to FIG. 12, as is also described with respect to FIG. 6, semiconductor switching elements SWp3 (the upper arm) and SWn3 (the lower arm) that are connected in series in each leg of the secondary-side bridge circuit 30b are complementarily turned on and off, and semiconductor switching elements SWp4 (the upper arm) and SWn4 (the lower arm) are also complementarily turned on and off. Furthermore, semiconductor switching elements SWn3 and SWp4 are turned on and off in phase and semiconductor switching elements SWp3 and SWn4 are turned on and off in phase.

Semiconductor switching elements SWp3, SWn3, SWp4, SWn4 each have a switching duty of 0.5. The switching duty is a ratio of an on-period to the switching cycle. Furthermore, the phase difference between the switching pattern of semiconductor switching elements SWp3, SWn3 and the switching pattern of semiconductor switching elements SWp4, SWn4 is 180° (n), and the phases of these switching patterns are inversed to each other.

Figure 13:
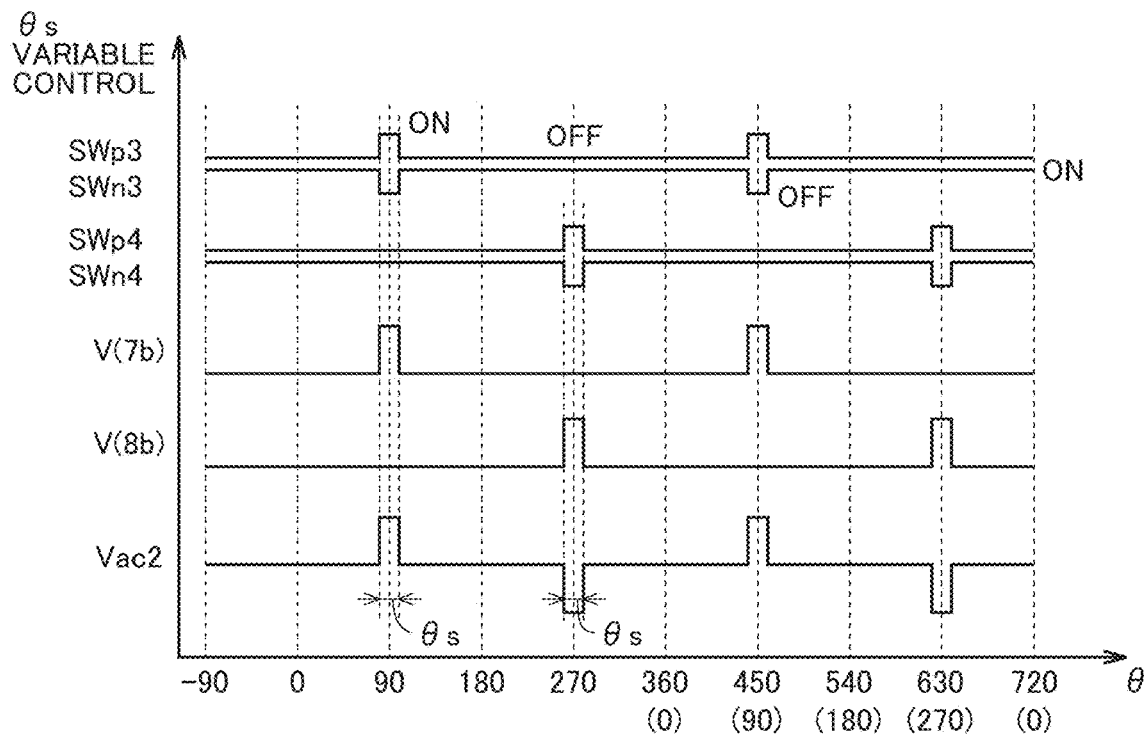
FIG. 13 is an operating waveform diagram illustrating a first example of the switching pattern of the bridge circuit in θs variable control in the power conversion device according to Embodiment 3.

FIG. 13 shows an operating waveform diagram describing a first example of the switching pattern of the secondary-side bridge circuit 30b in the θs variable control in the power conversion device according to Embodiment 3. The same switching phase θ as shown in FIG. 12 is indicated on the horizontal axis of FIG. 13.

Referring to FIG. 13, also for the θs variable control, at each leg, semiconductor switching elements SWp3 (the upper arm) and SWn3 (the lower arm) are complementarily turned on and off, and semiconductor switching elements SWp4 (the upper arm) and SWn4 (the lower arm) are complementarily turned on and off in a similar manner.

In particular, semiconductor switching element SWp3 has an on-period corresponding to voltage pulse width θs and centered at θ=90°. Semiconductor switching element SWp3 is controlled to be off during a period other than the on-period. Conversely, semiconductor switching element SWn3 has an off-period corresponding to the on-period of semiconductor switching element SWp3 centered at θ=90°. Semiconductor switching element SWn3 is controlled to be kept on in a period other than the off-period. As a result, a voltage pulse corresponding to the on-period of semiconductor switching element SWp3 is generated at alternating-current (AC) terminal 7b of inductance element 40.

In contrast, semiconductor switching element SWp4 has an on-period corresponding to voltage pulse width θs and centered at θ=270°. Semiconductor switching element SWp4 is controlled to be off in a period other than the on-period. Conversely, semiconductor switching element SWn4 has an off-period corresponding to the on-period of semiconductor switching element SWp4 centered at θ=270°. Semiconductor switching element SWn4 is controlled to be kept on in a period other than the off-period. As a result, a voltage pulse corresponding to the on-period of semiconductor switching element SWp4 is generated at AC terminal 8b of inductance element 40. This allows AC voltage Vac2 having voltage pulse width θs to be generated on the secondary side of inductance element 40 (transformer 45).

As such, in the first example shown in FIG. 13, each semiconductor switching element SW is turned on and off so as to have an on-period or off-period corresponding to voltage pulse width θs calculated by start-up control unit 203. In other words, the θs variable control described in Embodiments 1 and 2 can be achieved with the switching pattern that controls an on-period length of the semiconductor switching element SW included in the upper arm (or an off-period length of the semiconductor switching element included in the lower arm), in accordance with voltage pulse width θs.

Figure 14:
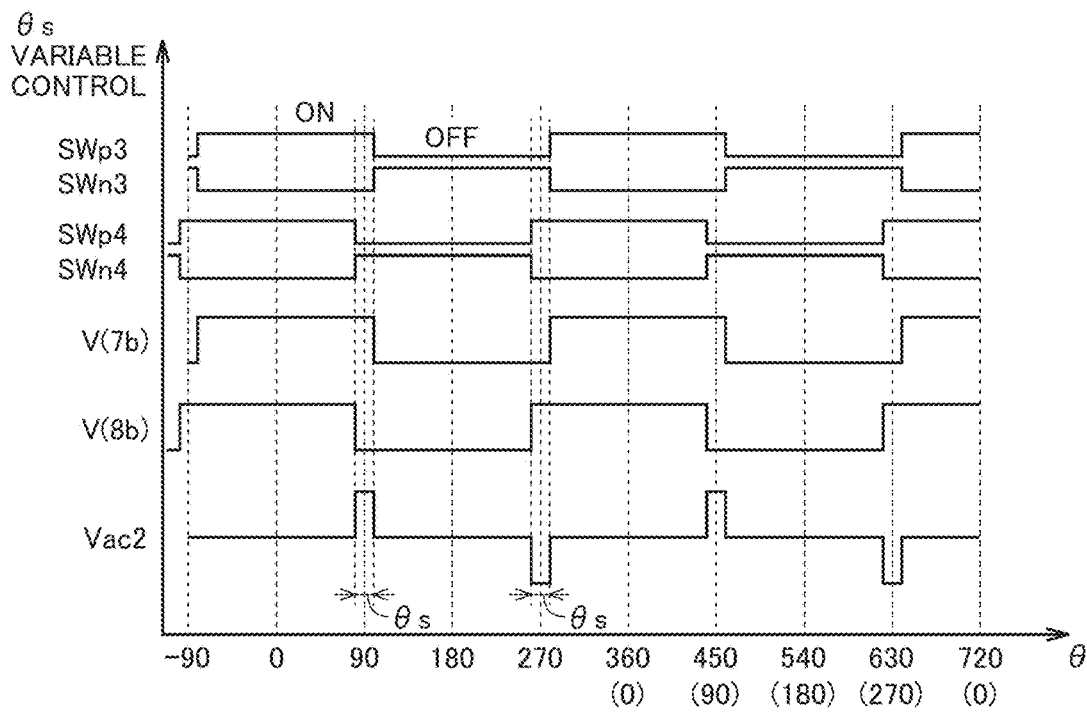
FIG. 14 is an operating waveform diagram illustrating a second example of the switching pattern of the bridge circuit in the θs variable control in the power conversion device according to Embodiment 3.

FIG. 14 shows an operating waveform diagram describing a second example of the switching pattern of the secondary-side bridge circuit 30b in the θs variable control in the power conversion device according to Embodiment 3. The same switching phase θ as shown in FIGS. 12 and 13 is indicated on the horizontal axis of FIG. 14. Note that the switching pattern shown in FIG. 13 is the same as shown in FIG. 9 according to Embodiment 1.

Referring to FIG. 14, semiconductor switching elements SWp3 (the upper arm) and SWn3 (the lower arm) are complementarily turned on and off, and semiconductor switching elements SWp4 (the upper arm) and SWn4 (the lower arm) are complementarily turned on and off. Furthermore, semiconductor switching elements SWp3, SWn3, SWp3, SWn4 each have a switching duty of 0.5.

In the θs variable control, a phase difference that changes in accordance with voltage pulse width θs, calculated by start-up control unit 203, is imparted to the switching pattern of semiconductor switching elements SWp3 and SWn3 (the third leg) and the switching pattern of semiconductor switching elements SWp4 and SWn4 (the fourth leg).

As a result, in inductance element 40, a phase difference corresponding to θs is caused between the pulse voltages of AC terminals 7b and 8b, consequently, allowing AC voltage Vac2 having voltage pulse width θs to be generated on the secondary side of inductance element 40 (transformer 45).

As such, in the second example shown in FIG. 14, the θs variable control described in Embodiments 1 and 2 can be achieved through the switching pattern control in which a phase difference, corresponding to voltage pulse width θs calculated by start-up control unit 203, is imparted, while keeping the switching duty of each semiconductor switching element SW at 0.5.

In the first example illustrated in FIG. 13, the on-time and the off-time vary to a great extent between the semiconductor switching elements SW, arousing a concern that the conduction loss in some of the semiconductor switching elements increases, leading to variations in heat value as well. In the second example shown in FIG. 14, in contrast, since the semiconductor switching elements SW have the same switching duty, the heat values can be rendered uniform.

Embodiment 4

In Embodiment 4, a description is given with respect to efficient detection of the peak value of an AC current Iac2, which is required for voltage pulse width θs in the θs variable control in Embodiment 2.

In a power conversion device according to Embodiment 4, the peak value of an AC current can be computed by detecting, twice, a current for each switching cycle of an semiconductor switching element SW, while current detection points relative to an output voltage pulse (AC voltage Vac2 in Embodiment 2) at fixed positions.

Figure 15:
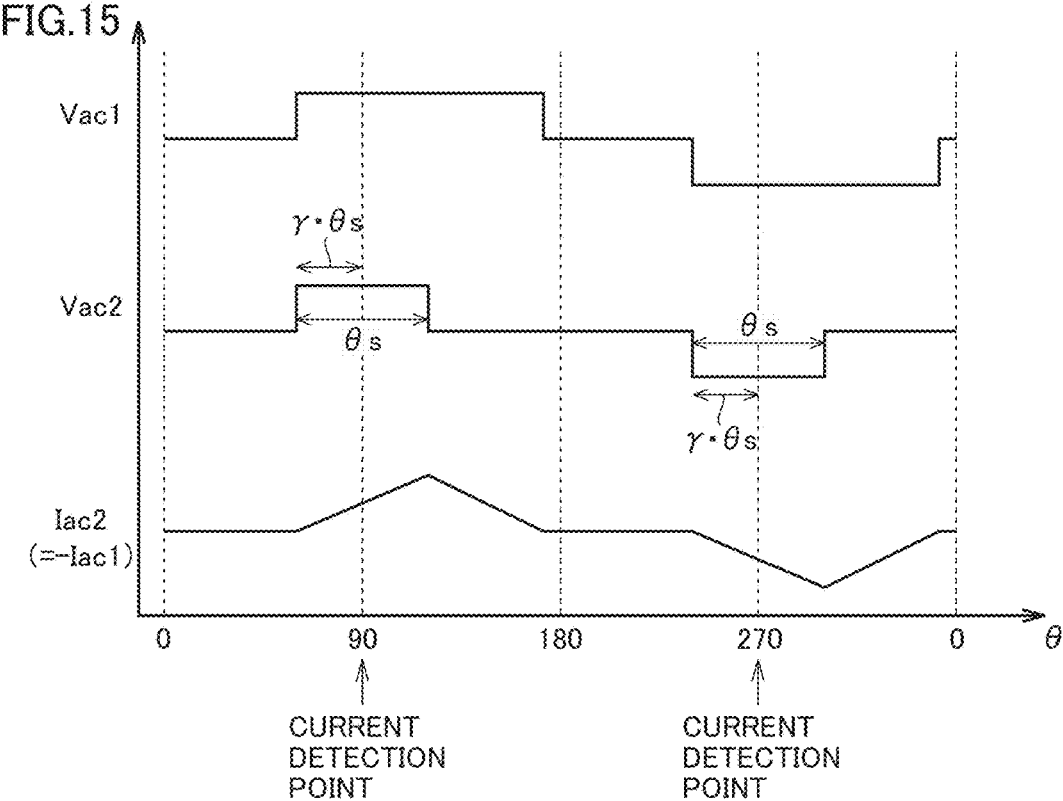
FIG. 15 is an operating waveform diagram illustrating one example relationship of waveforms of alternating-current (AC) voltages subjected to θs variable control and current detection timings in a power conversion device according to Embodiment 4.

FIG. 15 is an operating waveform diagram describing one example relationship of waveforms of AC voltages subjected to the θs variable control, and current detection timings in the power conversion device according to Embodiment 4.

Referring to FIG. 15, during the start-up control, the θs variable control at the secondary-side bridge circuit 30b causes AC voltage Vac2 having a voltage pulse width θs to be generated on the secondary side of inductance element 40. In response to AC voltage Vac2 being generated, AC current Iac2 is generated on the secondary side of inductance element 40. The semiconductor switching elements included in the primary-side bridge circuit 30a are turned off and the primary-side bridge circuit 30a operates in a diode rectifying mode. Thus, AC current Iac1 is generated on the primary side of inductance element 40 in accordance with AC current Iac2 (Iac1=−Iac2), and an AC voltage Vac1 is generated, resulting from AC current Iac1 on the primary side of inductance element 40.

During the start-up control, the primary-side DC voltage Vdc1 is not increased to the rated value. Consequently, a current caused by the voltage difference between the primary-side AC voltage Vac1 and the secondary-side AC voltage Vac2 flows from the primary-side bridge circuit 30a into the secondary-side bridge circuit 30b.

As the secondary-side AC voltage Vac2 decreases to zero, the secondary-side AC current Iac2 is decreased by the primary-side AC voltage Vac1. As the secondary-side AC current Iac2 decreases to zero, the primary-side AC voltage decreases to zero as well.

As is understood from FIG. 15, the secondary-side AC current Iac2 increases at a pulse site of AC voltage Vac2 (voltage pulse width θs), and turns to decrease when Vac2=0. Accordingly, the phase of AC current Iac2 at a peak value corresponds to the end point of a voltage pulse.

As a result, if a current value of AC current Iac2 can be detected within voltage pulse width θs, the peak value (Iacp in Embodiment 2) of the AC current can be determined by a proportional calculation, without having to extract the peak value of a current detection value within voltage pulse width θs.

For example, as shown in FIG. 15, if a current detector is provided with two fixed sampling timings (hereinafter, also referred to as a "current detection point") (when the switching phase θ=90° and 270° each) for each switching cycle, the peak value of AC current can be calculated by computations as described above by generating, by the θs variable control, a voltage pulse in a phase period that contains a current detection point. In other words, the start point and the end point of a voltage pulse are positioned before and after the current detection point.

With the use of a parameter γ (0<γ<1), obtained by dividing the length of a period from the start point of voltage pulse width θs, set by the θs variable control, to a current detection point by voltage pulse width θs, a peak value Iacp2 of the AC current can be determined by computations according to the following Equation (7), using the detection value of AC current Iac2 at that current detection point:

$$Iac2p = (1/\gamma) \cdot Iac2 \quad (7)$$

For example, in the first example of Embodiment 3 (FIG. 13), the center points of the voltage pulse are fixed to θ=90° and 270°, and a pulse width of θs is provided centered on each center point. In this case, γ is a fixed value. In particular, if the voltage pulse is provided with the start point and the end point symmetrically positioned on opposite sides of the center point, γ=0.5 is fixed. Thus, peak value Iac2p can be calculated by multiplying the detection value of AC current Iac2 by two.

In the second example of Embodiment 3 (FIG. 14), the phase of the voltage pulse can be any, insofar as the switching patterns of semiconductor switching elements SW are created so that a phase difference corresponding voltage pulse width θs is imparted to the switching patterns while the switching duty of each semiconductor switching element SW is kept at 0.5. In other words, the position of the current detection point relative to the voltage pulse can be controlled at will. Accordingly, the peak value (Iac2p) of AC current, which is used for the computations for the start-up control (θs variable control) according to Embodiment 2, can be calculated with high accuracy by adjusting the switching patterns so that the tail portion of voltage pulse, at which ringing or the like have little effects on the current and the behavior of the current stabilizes, coincides with the current detection point.

As described above, according to the configuration of Embodiment 4, the peak value of AC current can be determined with high accuracy also in a system in which a number of sampling times of AC current on the primary side and the secondary side of the system is limited.

Embodiment 5

Embodiment 5 will be described with reference to a start-up control of a power conversion device having a configuration in which DAB DC-to-DC converters 10 are connected in cascade.

Figure 16:
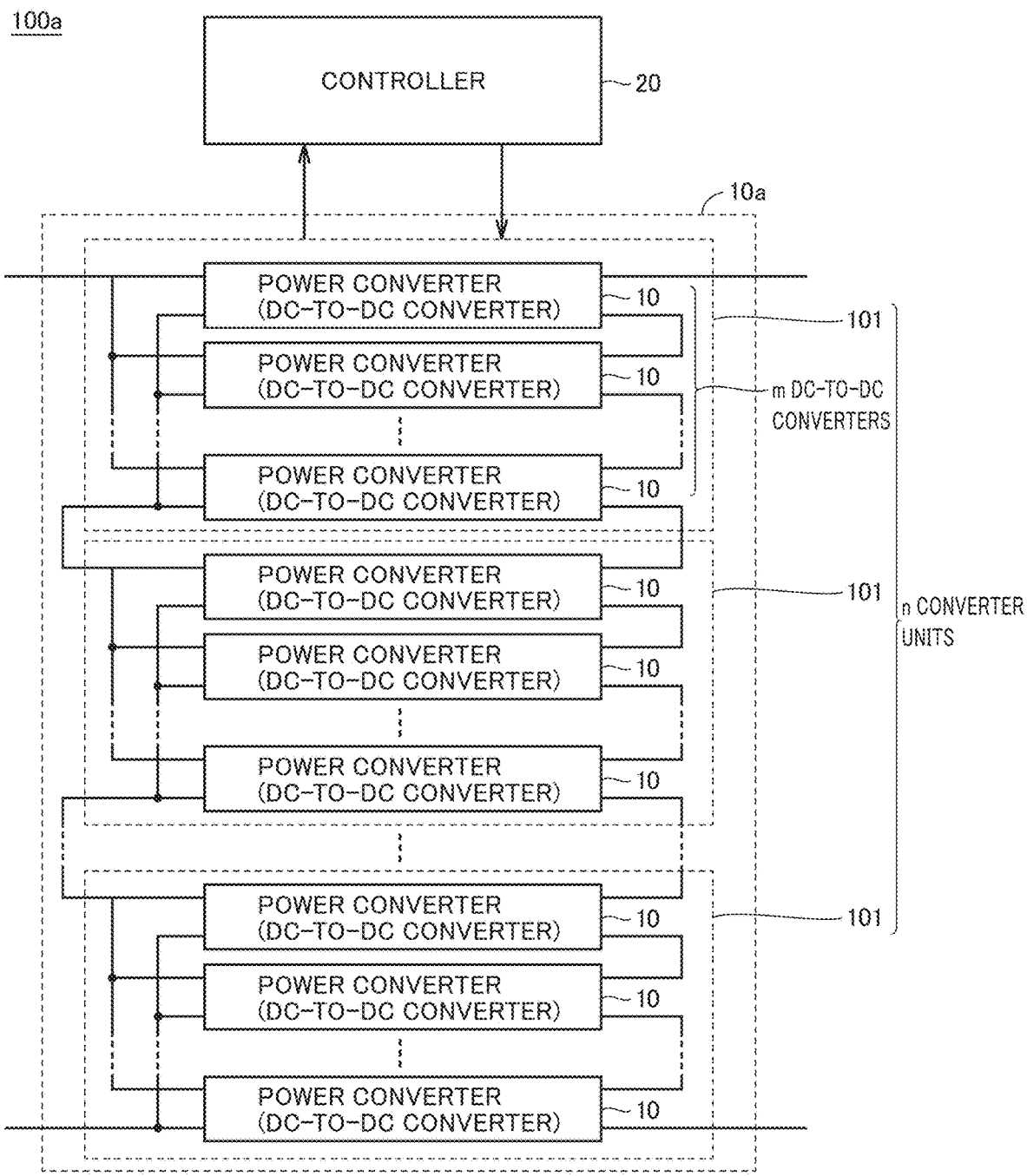
FIG. 16 is a block diagram illustrating a configuration of a power conversion device according to Embodiment 5.

FIG. 16 is a block diagram illustrating a configuration of power conversion device 100a according to Embodiment 5.

Referring to FIG. 16, power conversion device 100a according to Embodiment 5 includes n converter units 101 (n: a natural number greater than or equal to 1), each including m DC-to-DC converters 10 (m: a natural number greater than or equal to 2).

In each converter unit 101, m DC-to-DC converters 10 have primary-side direct-current (DC) terminals (5a, 6a of FIG. 1) connected in parallel and secondary-side DC terminals (5b, 6b of FIG. 1) connected in series. Furthermore, inn converter units 101, the primary-side DC terminals are connected in series and the secondary-side DC terminals are connected in series. As such, power conversion device 100a has a total of (m×n) DC-to-DC converters 10.

In the following, for the purpose of convenience, DC-to-DC converter 10 will also be referred to as a converter cell 10, a primary-side DC voltage Vdc1 of each DC-to-DC converter 10 will also be referred to as a primary-side cell voltage Vdc1m, and a secondary-side DC voltage Vdc2 of each DC/DC power converter 10 will also be referred to as a secondary-side cell voltage Vdc2. Moreover, a primary-side DC voltage of each converter unit 101 will also be referred to as a primary-side unit voltage (Vdc1), and a secondary-side DC voltage of each converter unit 101 will also be referred to as a secondary-side unit voltage.

If the DC terminal are connected in series liked power conversion device 100a, power conversion device 100a requires an output voltage control in which one of the sum value of the primary-side unit voltages and the sum value of the secondary-side unit voltages is controlled, and a voltage balance control for bringing the primary-side unit voltages in balance and the secondary-side cell voltages in balance.

Figure 17:
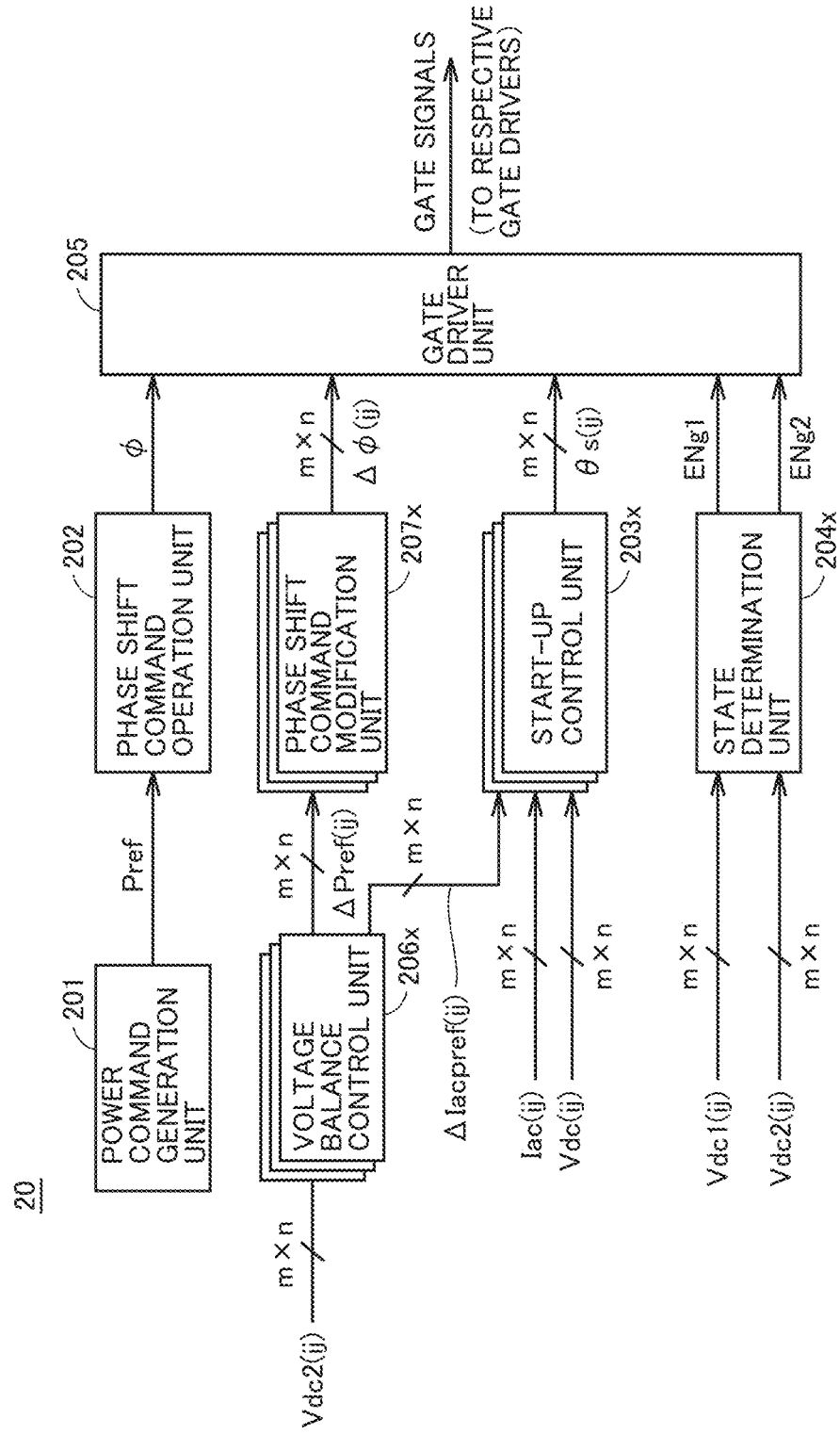
FIG. 17 is a block diagram illustrating a configuration of control performed by a controller included in the power conversion device according to Embodiment 5.

FIG. 17 is a block diagram illustrating a configuration of control performed by controller 20 included in power conversion device 100a according to Embodiment 5.

Referring to FIG. 17, controller 20 includes a power command generation unit 201 and a phase shift command operation unit 202, which are the same as Embodiment 1 (FIG. 5), and, for each converter cell 10, a start-up control unit 203x, a voltage balance control unit 206x, a phase shift command modification unit 207x, a state determination unit 204, and a gate driver unit 205. As a whole, (m×n) start-up control units 203x, (m×n) voltage balance control units 206x, and (m×n) phase shift command modification units 207x, each corresponding to a total number of the converter cells 10, are provided.

Figure 18:
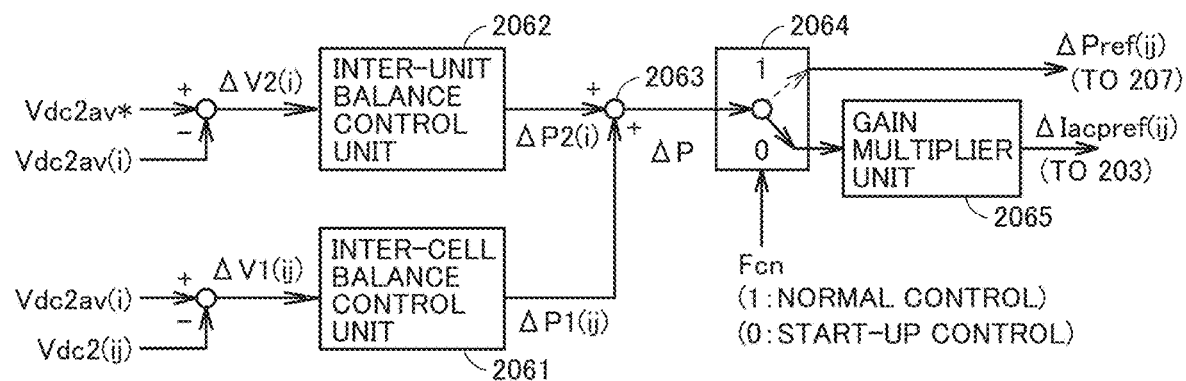
FIG. 18 is a block diagram illustrating details of the configuration of a voltage balance control unit shown in FIG. 17.

FIG. 18 shows a block diagram illustrating details of the configuration of voltage balance control unit 206x. Voltage balance control unit 206x is disposed in correspondence with the j-th (j: a natural number from 1 to m) converter cell 10 (ij) within the i-th converter unit 101 (i: a natural number from 1 to n).

Referring to FIG. 18, voltage balance control unit 206x includes an inter-cell balance control unit 2061, an inter-unit balance control unit 2062, an adding unit 2063, a selector switch 2064, and a gain multiplier unit 2065.

Inter-cell balance control unit 2061 can indirectly control the secondary-side cell voltage Vdc2 by controlling the power transmitted between the primary side and the secondary side of each converter cell 10. Furthermore, in each converter unit 101, the primary-side DC terminals (5a, 6a) of converter cells 10 are connected in parallel. Owing to this, even if the powers, transmitted between the primary sides and the secondary sides of the converter cells 10 within converter unit 101, are provided with a deviation, the deviation has no effect on the primary-side unit voltage Vdc1, insofar as the summation of powers transmitted within the converter cell unit 10 remains unchanged. Accordingly, inter-cell balance control unit 2061 provides a difference in transmission power between n converter cells 10 belonging to the same converter unit 101, thereby equilibrating the secondary-side DC voltages Vdc2 of m converter cells 10 within the converter unit 101, without interfering with the primary-side unit voltage control.

Inter-cell balance control unit 2061 receives a first voltage deviation $\Delta V1(ij)$, which is calculated by subtracting the secondary-side cell voltage Vdc2(ij) of the converter cell 10(ij) from a unit average voltage Vdc2av(i). Unit average voltage Vdc2av(i) is an average of the secondary-side cell voltages Vdc2 of m converter cells 10 within i-th converter unit 101.

Inter-cell balance control unit 2061 calculates an amount of modification $\Delta P1(ij)$ to the power command value, based on first voltage deviation $\Delta V1(ij)$. If $\Delta V1(ij)>0$, in order to increase the secondary-side cell voltage Vdc2 of a converter cell 10, $\Delta P1(ij)>0$ is set so that the power transmitted from the primary side of that converter cell 10 to the secondary side is higher than the average within converter unit 101. Conversely, if $\Delta V1(ij)<0$, in order to reduce the secondary-side cell voltage Vdc2, $\Delta P1(ij)<0$ is set so that the power transmitted from the primary side to the secondary side is lower than the average within converter unit 101. For example, the amount of modification $\Delta P1(ij)$ to the power command value can be calculated by multiplying first voltage deviation $\Delta V1(ij)$ by a predetermined coefficient which is for translating the voltage deviation to a power.

As with inter-cell balance control unit 2061, inter-unit balance control unit 2062 equilibrates the secondary-side cell voltages Vdc2 of the converter cells 10 on a converter unit 101-by-converter unit 101 basis by controlling the power transmitted by each converter unit 101.

A second voltage deviation $\Delta V(i)$ is input to inter-unit balance control unit 2062, where second voltage deviation $\Delta V(i)$ is calculated by subtracting unit average voltage Vdc2av(i) of i-th converter unit 101 from a total average voltage Vdc2av*. Total average voltage Vdc2av* is an average of the secondary-side cell voltages Vdc2 of (m×n) converter cells 10.

Based on second voltage deviation $\Delta V2(i)$, inter-unit balance control unit 2062 calculates an amount of modification $\Delta P2(i)$ to the power command value. If $\Delta V2(i)>0$, in order to increase unit average voltage Vdc2av(i) of a converter unit 101, $\Delta P2(i)>0$ is set so that the powers transmitted by converter cells 10 belonging to that converter unit 101 is higher than the average among all the converter cells included in power conversion device 100a. Conversely, if $\Delta V2(i)<0$, in order to reduce unit average voltage Vdc2av(i), $\Delta P2(i)<0$ is set so that the powers transmitted by converter cells 10 belonging to converter unit 101 is lower than the average of all the converter cells included in power conversion device 100a. The amount of modification $\Delta P2(i)$ to the power command value can also be calculated by multiplying second voltage deviation $\Delta V2(i)$ by a predetermined coefficient which is for translating the voltage deviation to a power. Amount of modification $\Delta P2(i)$ is common between m converter cells 10 within the same converter unit 101.

Adding unit 2063 outputs $\Delta P$, which is obtained by adding, together, the amount of modification $\Delta P1(ij)$ to the power command value calculated by inter-cell balance control unit 2061 and the amount of modification $\Delta P2(i)$ to the power command value calculated by inter-unit balance control unit 2062. Since the summation of $\Delta P$s calculated by (m×n) voltage balance control units 206 is zero, it should be noted that the voltage balance control does not affect the power transmission between the primary side and the secondary side of power conversion device 100a.

Selector switch 2064 switches $\Delta P$ output paths from adding unit 2063, in accordance with a control flag Fcn for distinguishing between the normal control and the start-up control. In the normal control where control flag Fcn is set to "1," $\Delta P$ from adding unit 2063 is transmitted to phase shift command modification unit 207x of FIG. 17, as the amount of modification $\Delta Pref(ij)$ to the voltage command value at the converter cell 10(ij).

In contrast, in the start-up control where control flag Fcn is set to "0," $\Delta P$ from adding unit 2063 is transmitted to gain multiplier unit 2065. Gain multiplier unit 2065 calculates the amount of modification $\Delta Iacpref(ij)$ to AC current peak command value Iacpref at the converter cell 10(*ij*) by multiplying AP corresponding to the amount of modification ΔPref(ij) to the voltage command value by a predetermined gain. The amount of modification ΔIacpref(ij) is transmitted to start-up control unit 203*x* of FIG. 17. The amount of modification ΔIacpref(ij) has a value proportional to AP described above, and thus it is understood that the summation of (m×n) amounts of modification ΔIacpref(ij) is also zero.

Referring again to FIG. 17, power command generation unit 201 generates power command value Pref which is common to converter cells 10, based on a power command value for the entirety of power conversion device 100 described in Embodiment 1. Based on power command value Pref, phase shift command operation unit 202 generates the command value for the phase shift amount φ between the primary-side bridge circuit 30*a* and the secondary-side bridge circuit 30*b* of the converter cell 10, as with Embodiment 1. Phase shift command operation unit 202 generates a command value that is common between converter cells 10.

Based on the amount of modification ΔPref(ij) to the voltage command value output from voltage balance control unit 206*x*, phase shift command modification unit 207*x* calculates, for each of (m×n) converter cells 10, an amount of modification Δφ(ij) to the command value for the phase shift amount. Gate driver unit 205 generates gate signals for the switching control over the semiconductor switching elements SW included in the primary-side bridge circuit 30*a* and the secondary-side bridge circuit 30*b*, in accordance with a modified phase shift amount φ, the modified phase shift amount φ being obtained by adding, to the common command value for phase shift amount, the amount of modification Δφ(ij) to the command value for the phase shift amount for each of (m×n) converter cells 10.

This allows, in the normal control according to power conversion device 100*a* of Embodiment 5, the power transmission between the primary side and the secondary side of power conversion device 100*a* that is in accordance with power command value Pref, while the voltage balance control unit 206 is equilibrating the secondary-side cell voltages Vdc2 of converter cells 10.

Note that in power conversion device 100*a* of FIG. 16, the primary-side DC terminals of each converter unit 101 are connected in series. Thus, a deviation in power transmitted between m converter cells 10 within converter unit 101, if any, affects the primary-side unit voltage. Accordingly, in order to bring the primary-side unit voltages of converter units 101 into balance, for example, a resistor (not shown) can be connected in parallel to the primary-side terminal of each converter unit 101. Alternatively, converter units 101 can be brought into balance by connecting a DC-to-DC converter (not shown) between converter units 101. This allows the primary-side cell voltages and the secondary-side cell voltages of the converter cells to be brought into balance. This method, since it requires no insertion of resistors, allows reduced losses.

The power conversion device according to Embodiment 5 allows the secondary-side cell voltages Vdc2 of converter cells 10 to be equilibrated also in the start-up control, in addition to the normal control.

Figure 19:
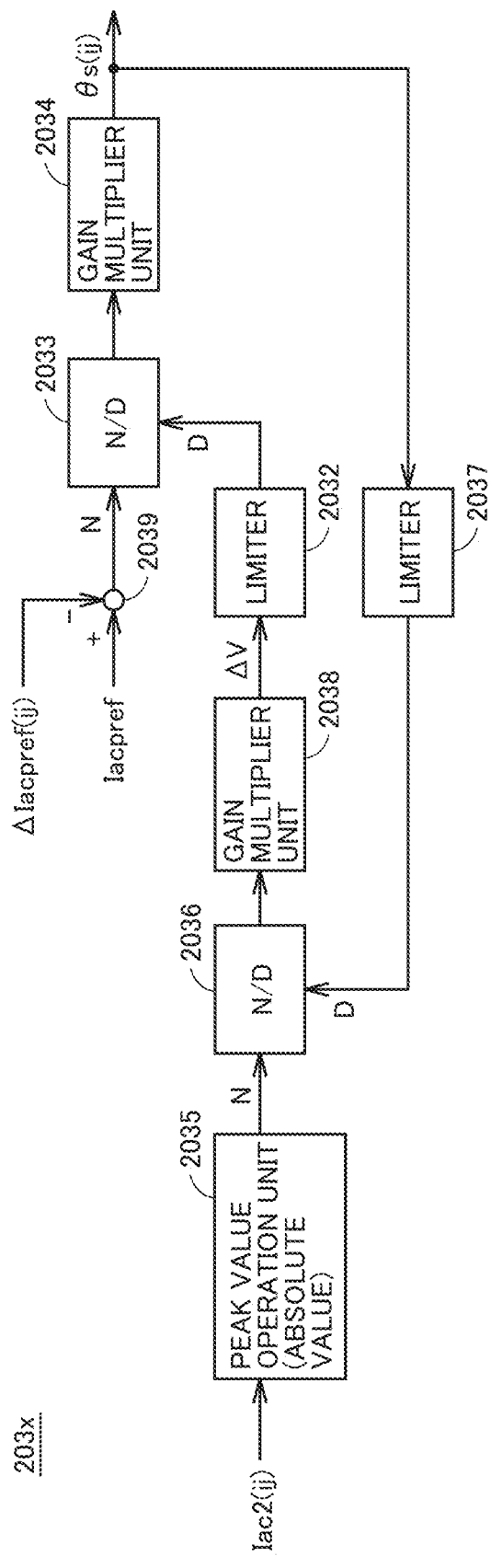
FIG. 19 is a block diagram illustrating details of the configuration of a start-up control unit shown in FIG. 17.

FIG. 19 shows a block diagram illustrating details of the configuration of start-up control unit 203*x*. Start-up control unit 203*x* is disposed in correspondence with the j-th converter cell 10(*ij*) within i-th converter unit 101.

Referring to FIG. 19, start-up control unit 203*x* according to Embodiment 5 is the same as start-up control unit 203 according to Embodiment 2 (FIG. 11), except for further including a modification computing unit 2039. In the example of FIG. 19, during the start-up control, modification computing unit 2039 subtracts an amount of modification ΔIacpref(ij) provided from voltage balance control unit 206*x* from AC current peak command value Iacpref which is a common value to converter cells 10.

As a result, divider unit 2033 divides the AC current peak command value (Iacpref−ΔIacpref), modified for the voltage balance control, by voltage difference ΔV, thereby calculating voltage pulse width θs(ij) for use in the start-up control (θs variable control) of converter cell 10(*ij*). Voltage pulse width θs(ij) according to Embodiment 5 is voltage pulse width θs according to Embodiment 2 having the amount of modification applied thereto for the voltage balance control between converter cells 10.

Note that start-up control unit 203*x* can be configured by connecting the same modification computing unit 2039 as FIG. 19 to node N of divider unit 2033 in start-up control unit 203 according to Embodiment 1 (FIG. 7). In other words, voltage pulse width θs(ij) for use in the θs variable control during the start-up control for converter cell 10(*ij*) can be calculated by applying the same start-up control as Embodiment 1 and using the AC current peak command value (Iacpref−ΔIacpref) having the amount of modification applied thereto for the voltage balance control.

Figure 20:
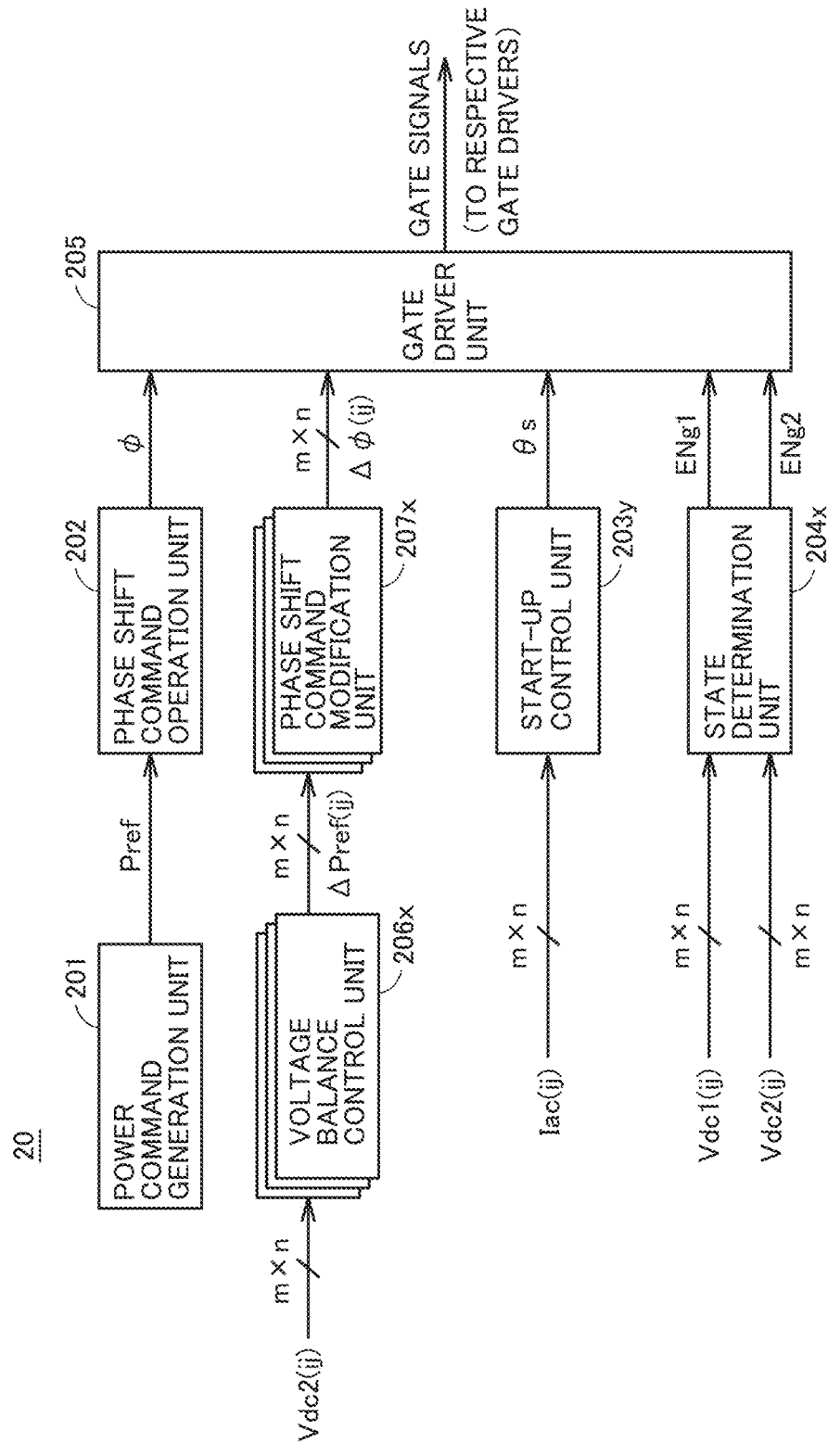
FIG. 20 is a block diagram illustrating a variation of the configuration of control performed by the controller included in the power conversion device according to Embodiment 5.

Referring again to FIG. 17, based on the primary-side cell voltages Vdc1 and the secondary-side cell voltages Vdc2 of (m×n) converter cells 10, state determination unit 204*x* generates switching permit signal ENg1 for the primary-side bridge circuit 30*a* and switching permit signal ENg2 for the secondary-side bridge circuit 30*b*. In the example of FIG. 20, switching permit signals ENg1, ENg2 are generated commonly between (m×n) converter cells 10. Accordingly, switching permit signal ENg1 does not change to "1" until the (m×n) primary-side unit voltages Vdc1 all increase higher than a determination voltage (the rated value). Similarly, switching permit signal ENg2 does not change to "1" until the (m×n) secondary-side cell voltages Vdc2 all increase higher than a determination voltage (the rated value). In other words, (m×n) converter cells 10 have common timings for the completion of charging of the one-side DC terminals (i.e., the start of the θs variable control) and for the completion of charging of the other-side DC terminals through the θs variable control (i.e., the end of the start-up control).

Note that switching permit signals ENg1, ENg2 may be separately generated between (m×n) converter cells 10. In this case, the θs variable control start timing and the start-up control end timing are separately controlled for each converter cell 10.

Gate driver unit 205 generates a gate signal for each semiconductor switching element SW in each of the normal control and the start-up control, based on switching permit signals ENg1, ENg2, the command value for voltage pulse width θs from start-up control unit 203*x* (the start-up control), and the command value for and the amount of modification to the phase shift amount φ (the normal control). As described above, in the normal control, the gate signal is generated in accordance with the phase shift amount φ having the amount of modification Δφ(ij) applied thereto.

As described above, in power conversion device 100*a* according to Embodiment 5, having the configuration in which DAB DC-to-DC converters (converter cells) 10 are connected in cascade, the start-up control having applied thereto the same θs variable control as Embodiments 1 and 2 allows prompt start-up of each converter cell 10 by charging the primary-side DC terminals 5a, 6a and the secondary-side DC terminals 5b, 6b one after another, without allowing too much current to flow through inductance element 40. Furthermore, the start-up control can start up each converter cell 10, while reducing variations in secondary-side cell voltage Vdc2 of converter cells 10 by modifying the command value for voltage pulse width θs by reflecting the output of voltage balance control unit 206x to the command value.

FIG. 20 is a block diagram illustrating a variation of the configuration of control performed by the controller included in the power conversion device according to Embodiment 5.

Referring to FIG. 20, controller 20 according to a variation of Embodiment 5 has the same configuration as that of Embodiment 5 (FIG. 17), except for including a start-up control unit 203y, instead of start-up control unit 203x provided for every one of (m×n) converter cells 10. Start-up control unit 203y is commonly provided for (m×n) converter cells 10. The other configuration of FIG. 20 is the same as FIG. 17, and the description thereof thus will not repeated. In other words, the voltage balance control described with respect to FIGS. 17 and 18 is applied to the normal control for power conversion device 100a.

Figure 21:
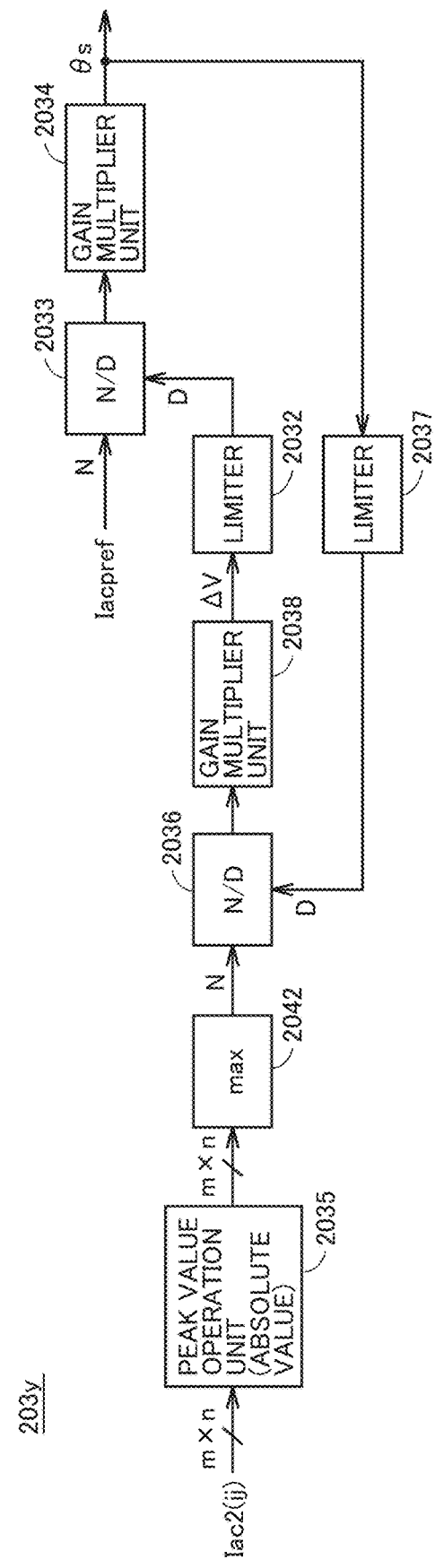
FIG. 21 is a block diagram illustrating details of the configuration of a start-up control unit shown in FIG. 20.

FIG. 21 is a block diagram illustrating a variation of the start-up control unit included in the power conversion device according to Embodiment 5. FIG. 21 shows a detailed configuration of start-up control unit 203y of FIG. 20.

Referring to FIG. 21, start-up control unit 203y is the same as start-up control unit 203 (FIG. 11) according to Embodiment 2, except for further including a maximum extraction unit 2042. Furthermore, peak value operation unit 2035 receives AC currents Iac2 from (m×n) converter cells 10, extracts the peak values of AC currents Iac2, and outputs (m×n) absolute values (i.e., |Iac2p1) of the peak values for respective converter cells 10. Maximum extraction unit 2042 extracts the maximum of (m×n) |Iac2p1 absolute values output from peak value operation unit 2035, and outputs the extracted maximum to node N of divider unit 2036.

Accordingly, start-up control unit 203y of FIG. 21 can set voltage pulse width θs for the start-up control and charge the other-side DC terminals so that a peak value (the absolute value) |Iac2p1 of AC current does not exceed AC current peak command value Iacpref in all converter cells 10.

As such, according to the variation shown in FIGS. 20 and 21, the same θs variable control as Embodiments 1 and 2 is applied to the start-up control for power conversion device 100a having the configuration in which DAB DC-to-DC converters (converter cells) 10 are connected in cascade, thereby allowing prompt start-up of each converter cell 10 so that, in particular, too much current is not generated at all converter cells 10. Compared to the start-up control described with respect to FIGS. 17 through 19, the control operation load and the amount of communications in the start-up control can be reduced.

Note that in the embodiments described above, the start-up control has been described in which the secondary-side DC terminals 5b, 6b are charged and the primary-side DC terminals 5a, 6a are subsequently charged through the θs variable control. In other words, the example has been described that the secondary-side DC terminals 5b, 6b correspond to "one-side DC terminals," the secondary-side bridge circuit 30b corresponds to "one-side bridge circuit," the primary-side DC terminals 5a, 6a correspond to "other-side DC terminals," and the primary-side bridge circuit 30a corresponds to "other-side bridge circuit." In contrast, the order of charging of the primary-side DC terminals 5a, 6a and the secondary-side DC terminals 5b, 6b can be interchanged, and the start-up control can be one in which the primary-side DC terminals 5a, 6a are charged, and the secondary-side DC terminals 5b, 6b are subsequently charged through the θs variable control. In this case, the primary-side DC terminals 5a, 6a correspond to "one-side DC terminals," the primary-side bridge circuit 30a corresponds to "one-side bridge circuit," the secondary-side DC terminals 5b, 6b correspond to "other-side DC terminal," and the secondary-side bridge circuit 30b corresponds to "other-side bridge circuit." Furthermore, the completion of charging in S120 of FIG. 9 can be determined, using switching permit signal ENg1, and the completion of charging in S140 can be determined, using switching permit signal ENg2. In Embodiment 2, etc., AC current Iac1 needs to be used, instead of AC current Iac2, to calculate the command value for voltage pulse width θs.

In each embodiment, in general, switching element 11 and diode 12, shown in FIG. 2, can be produced, using Si (silicon) as a semiconducting material. However, they can be produced, using SiC (silicon carbide), GaN (gallium nitride)-based material, or a so-called wide bandgap semiconductor having a greater bandgap than Si, such as diamond. Switching element 11 and diode 12 produced with a wide bandgap semiconductor allows high withstand voltage and low losses, and the charge rate in the start-up control is expected to increase even faster.

The presently disclosed embodiments above should be considered illustrative in all aspects and do not limit the present disclosure. The scope of the present disclosure is defined by the appended claims, rather than by the above description. All changes which come within the meaning and range of equivalency of the appended claims are intended to be embraced within their scope.

REFERENCE SIGNS LIST 2a, 3a primary-side AC terminal; 2b, 3b secondary-side AC terminal; 4a, 4b smoothing capacitor; 5a, 6a primary-side DC terminal; 5b, 6b secondary-side DC terminal; 7a, 7b, 8a, 8b AC terminal; 10 DC-to-DC converter (converter cell); 11 switching element; 12 diode; 13 snubber capacitor; 20 controller; 22 memory; 23 input/output circuit; 30a primary-side bridge circuit; 30b secondary-side bridge circuit; 40 inductance element; 41, 42 reactor; 45 transformer; 46a primary-side winding; 46b secondary-side winding; 100, 100a power conversion device; 101 converter unit; 200 control device; 201 power command generation unit; 202 phase shift command operation unit; 203, 203x, 203y start-up control unit; 204, 204x state determination unit; 205, 250 gate driver unit; 206, 206x voltage balance control unit; 207x phase shift command modification unit; 2031 absolute value operation unit; 2032, 2037 limiter; 2033, 2036 divider unit; 2034, 2038, 2065 gain multiplier unit; 2035 peak value operation unit; 2039 modification computing unit; 2042 maximum extraction unit; 2061 inter-cell balance control unit; 2062 inter-unit balance control unit; 2063 adding unit; 2064 selector switch; D, N, N1b, N1a, N2b, N2a node; ENg1, ENg2 switching permit signal; Fcn control flag; Iac1, Iac2 AC current; Iacpref AC current peak command value; NLa, NLb, PLa, PLb power line; P power; Pref power command value; SWn1 through SWn4, SWp1 through SWp4 semiconductor switching element; Vdc1 primary-side DC voltage (primary-side cell voltage, primary-side unit voltage); Vdc2 secondary-side DC voltage (secondary-side cell voltage); Vdc2av* total average voltage; Vdc2av(i) unit average voltage; Vac1 primary-side AC voltage; and Vac2 secondary-side AC voltage.

The invention claimed is:
1. A power conversion device, comprising:
a power converter to perform bidirectional DC-to-DC conversion between primary-side direct-current (DC) terminals and secondary-side DC terminals; and
a controller to control operation of the power converter, wherein
the power converter includes:
a primary-side bridge circuit that performs bidirectional DC-to-AC power conversion between the primary-side DC terminals and primary-side alternating-current (AC) terminals, the primary-side bridge circuit including semiconductor switching elements;
a secondary-side bridge circuit that performs bidirectional DC-to-AC power conversion between the secondary-side DC terminals and secondary-side AC terminals, the secondary-side bridge circuit including semiconductor switching elements; and
an inductance element connected between the primary-side AC terminals and the secondary-side AC terminals, wherein
in a start-up control in which the primary-side DC terminals are charged to a first predetermined voltage and the secondary-side DC terminals are charged to a second predetermined voltage, the controller performs a charge control in which one-side DC terminals, which are one of (i) the primary-side DC terminals and (ii) the secondary-side DC terminals, are charged, while switching operations of the primary-side bridge circuit and the secondary-side bridge circuit are stopped, and, subsequently, other-side DC terminals, which are the other one of (i) the primary-side DC terminals and (ii) the secondary-side DC terminals, are charged,
in the charge control, a one-side bridge circuit connected to the one-side DC terminals performs a switching operation so as to output to the inductance element an AC voltage whose voltage pulse width has been subjected to a variable control, and an other-side bridge circuit connected to the other-side DC terminals stops a switching operation and operates in a diode rectifying mode, the one-side bridge circuit being one of the primary-side bridge circuit and the secondary-side bridge circuit, the other-side bridge circuit being the other one of the primary-side bridge circuit and the secondary-side bridge circuit,
the controller controls the switching operation of the one-side bridge circuit so that the voltage pulse width is smaller for a greater voltage difference of the one-side DC terminals from the other-side DC terminals,
the controller continuously calculates the voltage difference and changes the voltage pulse width depending on the calculated voltage difference, until the voltage of the other-side DC terminals becomes higher than a predetermined threshold voltage,
an AC current that flows through one-side AC terminals connected to the one-side bridge circuit is detected at a single current detection point provided in predetermined phases for each cycle of the switching operation, and
a start point and an end point of a voltage pulse whose voltage pulse width is controlled, are positioned before and after each of the current detection points per cycle of the switching operation.

2. The power conversion device according to claim 1, wherein
in the charge control, the controller causes the voltage pulse width to change in proportional to a value obtained by dividing a predetermined peak current value by the voltage difference.

3. The power conversion device according to claim 1, wherein
the voltage difference is calculated from an absolute value of a difference between a detection value of a primary-side DC voltage between the primary-side DC terminals and a detection value of a secondary-side DC voltage between the secondary-side DC terminals.

4. The power conversion device according to claim 1, wherein
the voltage difference is calculated as an estimate that is proportional to a value obtained by dividing, by the voltage pulse width, a peak value of the AC current that flows through the one-side AC terminals connected to the one-side bridge circuit; the one-side AC terminals being one of (i) the primary-side AC terminals and (ii) the secondary-side AC terminals.

5. The power conversion device according to claim 4, wherein
the peak value of the AC current is calculated, using a ratio of the voltage pulse width to a duration of time from the start point to the current detection point, and a detection value of the AC current at the current detection point.

6. The power conversion device according to claim 5, wherein
the start point and the end point of the voltage pulse are symmetrically positioned on opposite sides of the current detection point, and
the peak value of the AC current is calculated, using the detection value of the AC current at the current detection point multiplied by two.

7. The power conversion device according to claim 4, wherein
the power conversion device includes a plurality of converter cells connected in cascade, the plurality of converter cells each being the power converter, and
in the charge control during the start-up control, the controller commonly controls the voltage pulse width of each of the plurality of converter cells, and calculates the voltage difference as an estimate that is proportional to a value obtained by dividing a maximum of peak values of AC currents of the plurality of converter cells by the voltage pulse width.

8. The power conversion device according to claim 1, wherein
the controller sets the voltage pulse width for the charge control, in accordance with a predetermined relationship of the voltage pulse width and a combination of a primary-side DC voltage between the primary-side DC terminals and a secondary-side DC voltage between the secondary-side DC terminals.

9. The power conversion device according to claim 1, wherein
the primary-side bridge circuit and the secondary-side bridge circuit each have a plurality of legs connected in parallel between the primary-side DC terminals or between the secondary-side DC terminals,
the plurality of legs each have the semiconductor switching elements forming an upper arm and a lower arm which are connected in series between the primary-side DC: terminals via the primary-side AC terminals or between the secondary-side DC terminals via the secondary-side AC terminals, and turn on and off complementarily during the switching operation, and in the charge control, the controller controls the switching operation of the one-side bridge circuit so that an on-period length of the semiconductor switching elements included in the upper arm of each of the plurality of legs of the one-side bridge circuit changes in accordance with the voltage pulse width.

10. The power conversion device according to claim 1, wherein
the primary-side bridge circuit and the secondary-side bridge circuit each have a plurality of legs connected in parallel between the primary-side DC terminals or between the secondary-side DC terminals,
the plurality of legs each have the semiconductor switching elements forming an upper arm and a lower arm which are connected in series between the primary-side DC terminal via the primary-side AC terminals or between the secondary-side DC terminals via the secondary-side AC terminals, and complementarily turn on and off during the switching operation, and
in the charge control, the controller controls the switching operation of the one-side bridge circuit so that an on-period length and an off-period length of the semiconductor switching elements included in the upper arm and the lower arm of each of the plurality of legs are the same and a phase difference between switching patterns of the plurality of legs changes in accordance with the voltage pulse width.

11. The power conversion device according to claim 1, wherein
the power conversion device includes a plurality of converter cells connected in cascade, the plurality of converter cells each being the power converter,
in the charge control during the start-up control, the controller controls the voltage pulse width for each of the plurality of converter cells by applying an amount of modification for equilibrating DC voltages of the other-side DC terminals of the plurality of converter cells, and
a summation of amounts of the modification for the plurality of converter cells is zero.

12. A power conversion device, comprising:
a power converter to perform bidirectional DC-to-DC conversion between primary-side direct-current (DC) terminals and secondary-side DC terminals; and
a controller to control operation of the power converter, wherein
the power converter includes:
a primary-side bridge circuit that performs bidirectional DC-to-AC power conversion between the primary-side DC terminals and primary-side alternating-current (AC) terminals, the primary-side bridge circuit including semiconductor switching elements;
a secondary-side bridge circuit that performs bidirectional DC-to-AC power conversion between the secondary-side DC terminals and secondary-side AC terminals, the secondary-side bridge circuit including semiconductor switching elements; and
an inductance element connected between the primary-side AC terminals and the secondary-side AC terminals, wherein
in a start-up control in which the primary-side DC terminals are charged to a first predetermined voltage and the secondary-side DC terminals are charged to a second predetermined voltage, the controller performs a charge control in which one-side DC terminals, which are one of (i) the primary-side DC terminals and (ii) the secondary-side DC terminals, are charged, while switching operations of the primary-side bridge circuit and the secondary-side bridge circuit are stopped, and; subsequently, other-side DC terminals, which are the other one of (i) the primary-side DC terminals and (ii) the secondary-side DC terminals, are charged, in the charge control in the start-up control, a one-side bridge circuit connected to the one-side DC terminals performs a switching operation so as to output to the inductance element an AC voltage whose voltage pulse width has been subjected to a variable control, and an other-side bridge circuit connected to the other-side DC terminals stops a switching operation and operates in a diode rectifying mode, the one-side bridge circuit being one of the primary-side bridge circuit and the secondary-side bridge circuit, the other-side bridge circuit being the other one of the primary-side bridge circuit and the secondary-side bridge circuit, the controller controls the switching operation of the one-side bridge circuit so that the voltage pulse width of the AC voltage whose voltage has been subjected to the variable control is inversely proportional to a voltage difference of the one-side DC terminals from the other-side DC terminals, an AC current that flows through one-side AC terminals connected to the one-side bridge circuit is detected at a single current detection point provided in predetermined phases for each cycle of the switching operation, and a start point and an end point of a voltage pulse whose voltage pulse width is controlled, are positioned before and after each of the current detection points per cycle of the switching operation.

13. The power conversion device according to claim 12, wherein
in the charge control, the controller causes the voltage pulse width to change in proportional to a value obtained by dividing a predetermined peak current value by the voltage difference.

14. The power conversion device according to claim 12, Therein
the voltage difference is calculated from an absolute value of a difference bet a detection value of a primary-side DC voltage between the primary-side DC terminals and a detection value of a secondary-side DC voltage between the secondary-side DC terminals.

15. The power conversion device according to claim 12, wherein
the voltage difference is calculated as an estimate that is proportional to a value obtained by dividing, icy the voltage pulse width, a peak value of the AC current that flows through the one-side AC terminals connected to the one-side bridge circuit, the one-side AC terminals being one of (i) the primary-side AC terminals and (ii) the secondary-side AC terminals.

16. The power conversion device according to claim 15, wherein
the peak value of the AC current is calculated, using a ratio of the voltage pulse width to a duration of time from the start point to the current detection point, and a detection value of the AC current at the current detection point,
the start point and the end point of the voltage pulse are symmetrically positioned on opposite sides of the current detection point, and the peak value of the AC current is calculated, using the detection value of the AC current at the current detection point multiplied by two.

17. The power conversion device according to claim 12, wherein
the controller sets the voltage pulse width for the charge control, in accordance with a predetermined relationship of the voltage pulse width and a combination of a primary-side DC voltage between the primary-side DC terminals and a secondary-side DC voltage between the secondary-side DC terminals.

18. The power conversion device according to claim 12, wherein
the primary-side bridge circuit and the secondary-side bridge circuit each have a plurality of legs connected in parallel between the primary-side DC terminals or between the secondary-side DC terminals,
the plurality of legs each have the semiconductor switching elements forming an upper arm and a lower arm which are connected in series between the primary-side DC terminals via the primary-side AC terminals or between the secondary-side DC terminals via the secondary-side AC, terminals, and turn on and off complementarily during the switching operation, and
in the charge control, the controller controls the switching operation of the one-side bridge circuit so that an on-period length of the semiconductor switching elements included in the upper arm of each of the plurality of legs of the one-side bridge circuit changes in accordance with the voltage pulse width.

19. The power conversion device according to claim 12, wherein
the primary-side bridge circuit and the secondary-side bridge circuit each have a plurality of legs connected in parallel between the primary-side DC terminals or between the secondary-side DC terminals,
the plurality of legs each have the semiconductor switching elements forming an upper arm and a lower arm which are connected in series between the primary-side DC terminal via the primary-side AC terminals or between the secondary-side DC terminals via the secondary-side AC terminals, and complementarily turn on and off during the switching operation, and
in the charge control, the controller controls the switching operation of the one-side bridge circuit so that an on-period length and an off-period length of the semiconductor switching elements included in the upper arm and the lower arm of each of the plurality of legs are the same and a phase difference between switching patterns of the plurality of legs changes in accordance with the voltage pulse width.

20. The power conversion device according to claim 12, wherein
the power conversion device includes a plurality of converter cells connected in cascade, the plurality of converter cells each being the power converter,
in the charge control during the start-up control, the controller controls the voltage pulse width for each of the plurality of converter cells by applying an amount of modification for equilibrating DC voltages of the other-side DC terminals of the plurality of converter cells, and
a summation of amounts of the modification for the plurality of converter cells is zero.

* * * * *